US012755995B2

(12) United States Patent
Abbondanza et al.

(10) Patent No.: US 12,755,995 B2
(45) Date of Patent: Oct. 6, 2026

(54) NON-AQUEOUS REDOX FLOW BATTERIES

(71) Applicant: ENI S.P.A., Rome (IT)

(72) Inventors: Luigi Abbondanza, Novara (IT); Giuliana Schimperna, Novara (IT); Alessandra Tacca, Novara (IT)

(73) Assignee: ENI S.P.A., Rome (IT)

( * ) Notice: Subject to any disclaimer, the term of this patent is extended or adjusted under 35 U.S.C. 154(b) by 702 days.

(21) Appl. No.: 18/254,520

(22) PCT Filed: Nov. 23, 2021

(86) PCT No.: PCT/IB2021/060847

§ 371 (c)(1),
(2) Date: May 25, 2023

(87) PCT Pub. No.: WO2022/112932

PCT Pub. Date: Jun. 2, 2022

(65) Prior Publication Data

US 2024/0120519 A1 Apr. 11, 2024

(30) Foreign Application Priority Data

Nov. 25, 2020 (IT) ........................ 102020000028295

(51) Int. Cl.
*H01M 8/10* (2016.01)
*H01M 8/1023* (2016.01)
(Continued)

(52) U.S. Cl.
CPC ............. *H01M 8/10* (2013.01); *H01M 8/188* (2013.01); *H01M 8/1023* (2013.01); *H01M 2008/1095* (2013.01); *H01M 2300/0025* (2013.01)

(58) Field of Classification Search
CPC .............. H01M 2008/1095; H01M 2300/0025
See application file for complete search history.

(56) References Cited

U.S. PATENT DOCUMENTS 10,804,558 B2 * 10/2020 Tacca .................... H01M 8/188
2013/0224538 A1 8/2013 Jansen et al.

FOREIGN PATENT DOCUMENTS

CN 110642684 A 1/2020
EP 1155096 A1 3/2005
(Continued)

OTHER PUBLICATIONS

Machine translation of JP2014234495A, Dec. 15, 2014 (Year: 2014).*
(Continued)

*Primary Examiner* — Christopher P Domone
*Assistant Examiner* — Fiki Vanessa Owhoso
(74) *Attorney, Agent, or Firm* — CANTOR COLBURN LLP

(57) ABSTRACT

A non-aqueous redox flow battery (RFB) includes
- a positive compartment in whiehwherein a positive electrode is placed and in
- a non-aqueous liquid positive electrolyte is made to flow;
- a negative compartment in whiehwherein a negative electrode is placed and in
- a non-aqueous liquid negative electrolyte is made to flow; and
- an ion exchange membrane placed between the positive compartment and the negative compartment.
- The non-aqueous liquid positive electrolyte eomprises includes a solution of copper triflate or tetrafluoroborate complexes [Cu(I) or Cu(II)] in at least one organic solvent.
- The non-aqueous liquid negative electrolyte comprises includes a solution of at least one benzothiadiazole having the general formula (I):

(Continued)

(I)

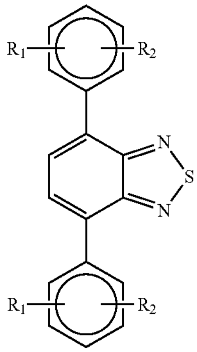

The non-aqueous redox flow battery (RFB) can be used in devices requiring medium to high power output (e.g., about 10 kW-100 MW) for several hours (i.e. >1 hour) such as devices for storing energy from industrial plants or alternative energy sources for later use or for sale.

6 Claims, 5 Drawing Sheets

(51) Int. Cl.

| | |
|---|---|
| ***H01M 8/1025*** | (2016.01) |
| ***H01M 8/18*** | (2006.01) |
| ***H01M 10/627*** | (2014.01) |

(56) References Cited

FOREIGN PATENT DOCUMENTS

JP 2014234495 A * 12/2014
WO WO-2018007991 A1 * 1/2018 ............ H01M 8/188

OTHER PUBLICATIONS

Machine translation of JP2014234495A (Year: 2014).*
Petronzi C. et al., "European Journal of Medicinal Chemistry" (2011), vol. 46, p. 488-496.
Huang J. et al., "Substituted Thiadiazoles as Energy-Rich Anolytes for Nonaqueous Redox Flow Cells", Journal of Material Chemistry A (2018), vol. 6, p. 6251-6254.
Hwang et al, "Improvement of Pharmacological Properties of Irreversible Thyroid Receptor Coactivator Binding Inhibitors", J. Med. Chem. 2009, 52, 3892-3901.
International Search Report for International Application No. PCT/IB2021/060847, dated May 2, 2022, 3 pages.
Mattiello et al., "Suzuki-Miyaura Micellar Cross-Coupling in Water, at Room Temperature, and under Aerobic Atmosphere", Org. Lett. 2017, 19, 654-657.
Singh P., "Application of Non-Aqueous Solvents to Batteries", Journal of Power Sources (1984), vol. 11, p. 135-142.
Wang et al, "Tuning photovoltaic performance of DOBT-based dyes via molecular design with ethynyl-linker and terminal electron-donating segment", Dyes and Pigments 140 (2017) 203-211.
Written Opinion for International Application No. PCT/IB2021/060847, dated May 2, 2022, 5 pages.
Zhang J. et al, "Comparing calendar and cycle life stability of redox active organic molecules for nonaqueous redox flow batteries", Journal of power sources (2018), vol. 397, p. 214-222.
Zhao Y. et al., "Unexpected electrochemical behavior of an anolyte redoxmer in flow battery electrolytes solvating cations help to fight against the thermodynamic-kinetic dilemma", Journal of Material Chemistry A (2020), p. 1-20, DOI: 10.1039/D0TA02214D.
Japanese Office Action for Application No. 2023-530686, dated Aug. 19, 2025, 5 pages.
Shimizu et al., "Polyarylene Synthesis by Cross-Coupling with HOMSi Reagents", Chemistry Letters, Japan, The Chemical Society of Japan, Jan. 2013, vol. 42, Issue 1, pp. 45-47, https://doi.org/10.1246/cl.2013.45.

* cited by examiner

NON-AQUEOUS REDOX FLOW BATTERIES

CROSS-REFERENCE TO RELATED APPLICATIONS

This application is a 35 U.S.C. § 371 National Stage patent application of PCT/IB2021/060847, filed on 23 Nov. 2021, which claims the benefit of Italian patent application 102020000028295, filed on 25 Nov. 2020, the disclosures of which are incorporated herein by reference in their entirety.

TECHNICAL FIELD

The present disclosure relates to non-aqueous redox flow batteries" (RFBs).

More particularly, the present disclosure relates to a non-aqueous redox flow battery (RFB) comprising: a positive compartment in which a positive electrode is positioned and in which a non-aqueous liquid positive electrolyte is made to flow; a negative compartment in which a negative electrode is positioned and in which a non-aqueous liquid negative electrolyte is made to flow; an ion exchange membrane positioned between the positive compartment and the negative compartment; wherein: said non-aqueous liquid positive electrolyte comprises a solution of copper triflate or tetrafluoroborate complexes [Cu(I) or Cu(II)] in at least one organic solvent; said non-aqueous liquid negative electrolyte comprises a solution of at least one benzothiadiazole having the specific general formula (I) provided below in at least one organic solvent.

Said non-aqueous redox flow battery (RFB) can be advantageously used in devices that require medium to high power output (e.g., about 10 kW-100 MW) for several hours (i.e. >1 hour) such as, for example, devices for storing energy from industrial plants or from alternative energy sources (such as solar or wind power) for later use (for example, for civil or industrial uses such as, for example, domestic or commercial use) or for sale.

BACKGROUND

Redox flow batteries (RFBs) are becoming an increasingly promising technology in energy storage because of their flexibility and scalability, but above all because of the separation between storable energy and delivered power, which differentiates them from all other secondary batteries, as well as their low environmental impact and safe operation.

Redox flow batteries (RFBs) are a type of rechargeable batteries in which electrolytes containing solutions of one or more electroactive species are made to flow through an electrochemical cell that converts chemical energy directly into electrical energy. Said electrochemical cell normally consists of a negative compartment (or negative half-cell) and a positive compartment (or positive half-cell), separated by an ion-exchange membrane. By storing these electrolytes in external reservoirs, the power components (i.e. the power output that depends on the size and design of said electrochemical cell) and the energy components (i.e. the stored energy that depends on the size of said external reservoirs and on the concentration of the electrolytes contained therein) are decoupled, with a clear gain in terms of flexibility in the applications thereof.

The characteristic feature of said solutions of one or more electroactive species is their high energy density, which depends on various factors such as, for example, the concentration in solution of the reacting electroactive species, the number of electrons transferred into the positive or negative compartment (or half-cell) and the reaction potential.

Most redox flow batteries (RFBs) use aqueous solutions of inorganic electrolytes. Recently, organic electrolytes have also been studied, which have proved to be of interest due to their stability in redox cycles. This type of redox flow batteries (RFBs), based on organic reagents, is characterised by higher energy density, lower environmental impact (it does not use heavy metals or corrosive solutions) and low cost. In fact, since the price of vanadium is quite high and greatly influenced by market fluctuations, the use of organic reagents would make it possible to avoid using elements whose distribution is localised in a few countries that can therefore control the market. In addition, aqueous systems are limited by the small electrochemical stability window of the water (about 1.2 V). For this reason, many studies are under way to develop flow batteries with non-aqueous systems, where the electrochemical window is much wider.

The fundamental characteristics for the operation of redox flow batteries (RFBs) concern both the stability and solubility of the reactive species in the electrolytes (>0.5-1 M). The solvents generally used are acetonitrile, propylene carbonate, ethylene carbonate, or mixtures thereof. Acetonitrile is the one most commonly used in cyclic voltammetry: in fact, although it is flammable and very volatile, it is a polar solvent capable of dissolving the supporting electrolytes and polar species that can be formed in redox flow batteries (RFBs) and also has a particularly wide electrochemical window (>5 V), while propylene carbonate, ethylene carbonate, or mixtures thereof are very interesting because of their low flammability.

Since the first redox flow battery (RFB) with non-aqueous solvents was reported in literature by Singh P., in "*Journal of Power Sources*" (1984), Vol. 11, pg. 135-142, many redox couples have been tried, both metallic [$Ru(acac)_3$, $Ru(bpy)_3$, $Fe(ppy)_3$, $V(acac)_3$, $Mn(acac)_3$], and non-metallic (2,2,6,6-tetramethylpiperidine 1-oxyl (TEMPO), N-methylphthalimide, quinoxaline, anthraquinones, viologen, benzothiadiazole).

For example, international patent application WO 2018/007991 on behalf of the Applicant, concerns a non-aqueous redox flow battery (RFB) comprising:

- a positive compartment in which a positive electrode is placed and in which a non-aqueous liquid positive electrolyte is made to flow;
- a negative compartment in which a negative electrode is placed and in which a non-aqueous negative liquid electrolyte is made to flow;
- an ion exchange membrane placed between the positive compartment and the negative compartment;

wherein:

- said non-aqueous liquid positive electrolyte comprises a solution of copper triflate or tetrafluoroborate complexes [Cu(I) or Cu(II)] in at least one organic solvent;
- said non-aqueous liquid negative electrolyte comprises a solution of at least one benzothiadiazole or a derivative thereof in at least one organic solvent.

Preferably, said non-aqueous liquid negative electrolyte comprises a solution of benzothiadiazole (1):

(1)

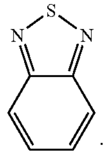

The above mentioned non-aqueous redox flow battery (RFB) is said to be advantageously; used in devices that require medium to large power output (e.g., about 100 kW-100 MW) for several hours (i.e. >1 hour) such as, for example, devices for storing energy from industrial plants or from alternative energy sources (such as solar or wind power) for subsequent use (for example, for domestic use) or for sale.

Zhang J. et al, in "*Journal of power sources*" (2018), Vol. 397, pg. 214-222, describe non-aqueous redox flow batteries (RFBs) in which the catholyte (non-aqueous liquid positive electrolyte) is a substituted dialkoxybenzene having formula (II):

(II)

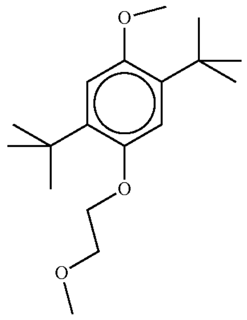

and the anolyte (non-aqueous liquid negative electrolyte) is a benzothiadiazole having formula (III):

(III)

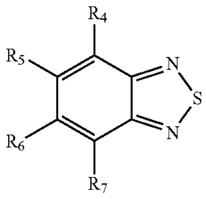

wherein:

$R_4$=H, CN;

$R_5$=H, $CH_3$; $CH_3O$; F $R_6$=H; $CH_3$;

$R_7$=H, CN, and study their stability and the degradation phenomena that occur as a result of oxidation-reduction reactions. However, Zhang J. et al. report that even in the presence of the anolyte/catholyte couple showing the highest chemical stability, the life cycle of such non-aqueous redox flow batteries (RFBs) is largely (but not exclusively) limited by parasitic reactions due to the crossover of reaction products between the compartments of non-aqueous redox flow batteries (RFBs). They also report that in many cases the cyclical performance of these non-aqueous redox flow batteries (RFBs) seems to be strongly influenced by the poor membrane selectivity.

Zhao Y. et al, in "*Journal of Material Chemistry A*" (2020), DOI: 10.1039/D0TA02214D ("*Accepted Manuscript*") describe the use of 2,1,3-benzothiadiazole (BzNSN) as a model anolyte (non-aqueous liquid negative electrolyte) in non-aqueous redox flow batteries ("RFBs") to study the effect of various supporting electrolytes. Zhao Y. et al. observed that varying the components of the supporting electrolyte changed both the redox potentials of 2,1,3-benzothiadiazole and the electrochemical stability. In particular, they observed that as the size of the supporting electrolyte cation increased, the redox potential of 2,1,3-benzothiadiazole became increasingly negative, going from −1.63 V vs $Ag/Ag^+$ with $Li^+$ at −1.82 V vs $Ag/Ag^+$ with larger cations such as $K^+$ and tetra-ethylammonium. In addition, larger cations increased the electrochemical stability of the model compound.

Huang J. et al, in "*Journal of Material Chemistry A*" (2018), Vol. 6, pg. 6251-6254, describe non-aqueous redox flow batteries (RFBs) in which the catholyte (non-aqueous liquid positive electrolyte) is a substituted dialkoxybenzene having formula (II):

(II)

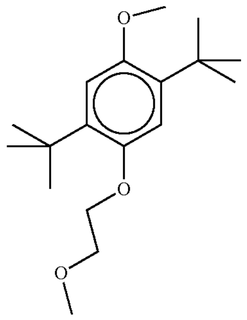

and the anolyte (non-aqueous liquid negative electrolyte) is a benzothiadiazole having formula (IV):

(IV)

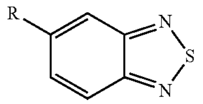

wherein R=H, $CH_3$, $OCH_3$, F, $CF_3$ and study the stability and degradation phenomena occurring as a result of oxidation-reduction reactions, in particular the lifetimes of anion radicals in acetonitrile: a discrepancy emerges between these lifetimes and the stability of redox flow batteries (RFBs), indicating the presence of additional parasitic reactions.

From the above it can be seen that, although benzothiadiazole and its derivatives are a valid redox species in non-aqueous redox flow batteries (RFBs), the high reactivity of the radical formed during the charging phase of such non-aqueous redox flow batteries (RFBs) makes the discharge operation difficult: in fact, the BTD· radical formed tends to bind to the membrane positioned between the positive and negative compartments or to the graphite electrodes present in said compartments, causing parasitic reactions.

SUMMARY

The Applicant was therefore faced with the problem of finding benzothiadiazole derivatives that do not have the above-mentioned drawbacks and are, therefore, able to make the non-aqueous redox flow batteries (RFBs) in which they are used more stable.

The Applicant has now found that certain benzothiadiazole derivatives having the specific general formula (I) provided below have good chemical stability during the charge-discharge cycles of the non-aqueous redox flow batteries (RFBs) in which they are used and are, therefore, capable of making said non-aqueous redox flow batteries (RFBs) more stable. Furthermore, said benzothiadiazole derivatives have very good electrochemical properties, determined by cyclic voltammetry, and high solubility in the organic solvents used (in particular, acetonitrile and propylene carbonate). In addition, said benzothiadiazole derivatives are capable of providing non-aqueous redox flow batteries (RFBs) with good performance, i.e. having a high potential difference) (E°) at open circuit and a high energy density ($\rho_e$).

The present disclosure provides a non-aqueous redox flow battery (RFB) comprising:

- a positive compartment in which a positive electrode is placed and in which a non-aqueous liquid positive electrolyte is made to flow;
- a negative compartment in which a negative electrode is placed and in which a non-aqueous liquid negative electrolyte is made to flow;
- an ion exchange membrane placed between the positive compartment and the negative compartment;

wherein:

- said non-aqueous liquid positive electrolyte comprises a solution of copper triflate or tetrafluoroborate complexes [Cu(I) or Cu(II)] in at least one organic solvent;
- said non-aqueous liquid negative electrolyte comprises a solution of at least one benzothiadiazole having general formula (I):

(I)

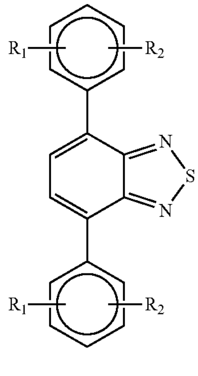

wherein:

$R_1$ and $R_2$, equal or different from each other, represent a hydrogen atom; or represent a $C_1$-$C_{20}$ alkyl group, preferably $C_1$-$C_{10}$, linear or branched, saturated or unsaturated; or represent a —O—$R_3$ group wherein $R_3$ is selected from $C_1$-$C_{20}$ alkyl groups, preferably $C_1$-$C_{10}$, linear or branched, saturated or unsaturated, or $R_3$ is selected from —$(CH_2)_n COOR_4$ groups wherein $R_4$ is selected from $C_1$-$C_{20}$ alkyl groups, preferably $C_1$-$C_{10}$, linear or branched, saturated or unsaturated, and n is an integer comprised between 1 and 10, preferably comprised between 1 and 8, or $R_3$ is selected from —$(CH_2)_n OR_4$ groups wherein $R_4$ and n have the same meanings reported above, or $R_3$ is selected from —$(CH_2CH_2O)_n R_4$ groups wherein $R_4$ and n have the same meanings reported above, or $R_3$ is selected from —$(CH_2)_n CN$ groups wherein n has the same meanings reported above, or $R_3$ is selected from —$(CH_2)_n NR_4R_5$ groups wherein $R_4$ and n have the same meanings reported above and $R_5$ is selected from $C_1$-$C_{20}$ alkyl groups, preferably $C_1$-$C_{10}$, linear or branched, saturated or unsaturated, or $R_3$ is selected from —$(CH_2)_n CONR_4R_5$ groups wherein $R_4$, $R_5$ and n have the same meanings reported above, or $R_3$ is selected from —$(CH_2)_n Si(R_4)_3$ groups wherein $R_4$ and n have the same meanings reported above, or $R_3$ is selected from —$(CH_2)_n Si(OR_4)_3$ groups wherein $R_4$ and n have the same meanings reported above;

provided that at least one of $R_1$ and $R_2$ is different from hydrogen and at least one of $R_1$ and $R_2$ is in position 2 of the phenyl;

in at least one organic solvent.

For the purpose of the present description and the following claims, the definitions of the numerical intervals always comprise the extreme values unless otherwise specified.

For the purpose of the present description and the following claims, the term "comprising" also includes the terms "which essentially consists of" or "which consists of".

For the purpose of the present description and the following claims, the term "$C_1$-$C_{20}$ alkyl groups" means linear or branched alkyl groups having from 1 to 20 carbon atoms, saturated or unsaturated. Specific examples of $C_1$-$C_{20}$ alkyl groups are: methyl, ethyl, n-propyl, iso-propyl, n-butyl, iso-butyl, t-butyl, n-pentyl, n-hexyl, n-heptyl, n-octyl, n-decyl, n-dodecyl.

In accordance with an embodiment of the present disclosure, said copper triflate or tetrafluoroborate complexes [Cu(I) or Cu(II)] may be chosen, for example, from: tetrakisacetonitrile copper(I) triflate [$Cu(NCCH_3)_4 \cdot CF_3SO_3$], copper(II) trifluoromethanesulfonate [$Cu(CF_3SO_3)_2$], tetrakisacetonitrile copper(I) tetrafluoroborate [$Cu(NCCH_3)_4 \cdot BF_4$], or mixtures thereof.

In accordance with an embodiment of the present disclosure, in said general formula (I):

$R_1$ and $R_2$, equal or different from each other, represent a hydrogen atom; or represent an —$OR_3$ group wherein $R_3$ is selected from —$(CH_2)_n COOR_4$ groups wherein $R_4$ is selected from $C_1$-$C_{20}$ alkyl groups, preferably $C_1$-$C_{10}$, linear or branched, saturated or unsaturated, and n is an integer comprised between 1 and 10, preferably comprised between 1 and 8, or $R_3$ is selected from —$(CH_2CH_2O)_n R_4$ groups wherein $R_4$ and n have the same meanings reported above; preferably they represent a propyloxycarbonylethyloxy group, a methoxycarbonylethyloxy group, a methoxyethoxyetyloxy group;

provided that at least one of $R_1$ and $R_2$ is different from hydrogen and at least one of $R_1$ and $R_2$ is in position 2 of the phenyl.

Specific examples of compounds having general formula (I) useful for the purpose of the present disclosure are reported in Table 1.
TABLE 1
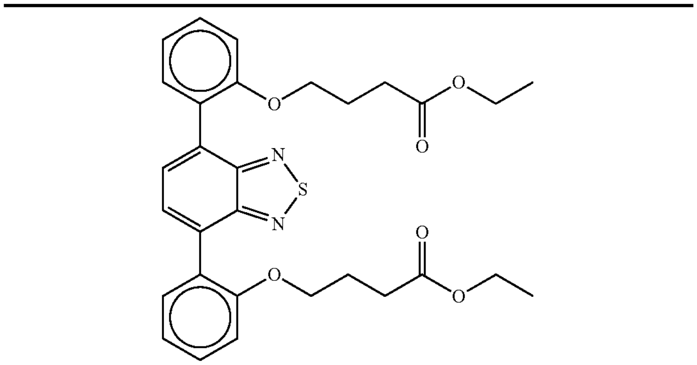
(2)
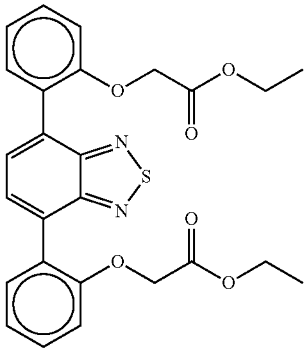
(3)
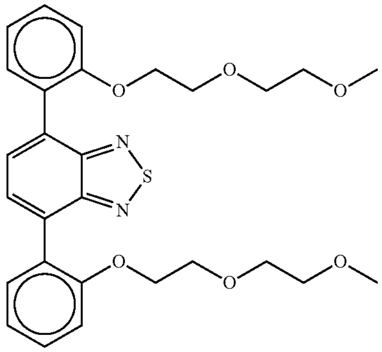
(4)
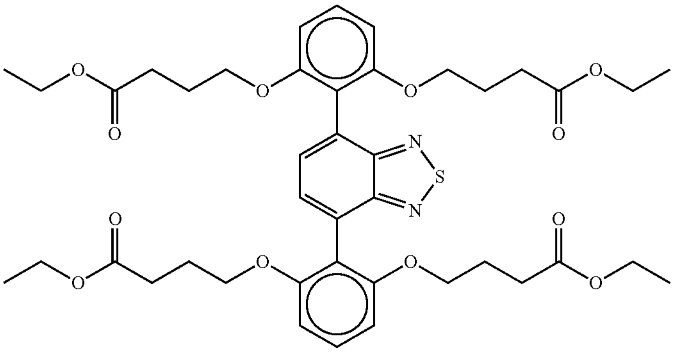
(5)

TABLE 1-continued

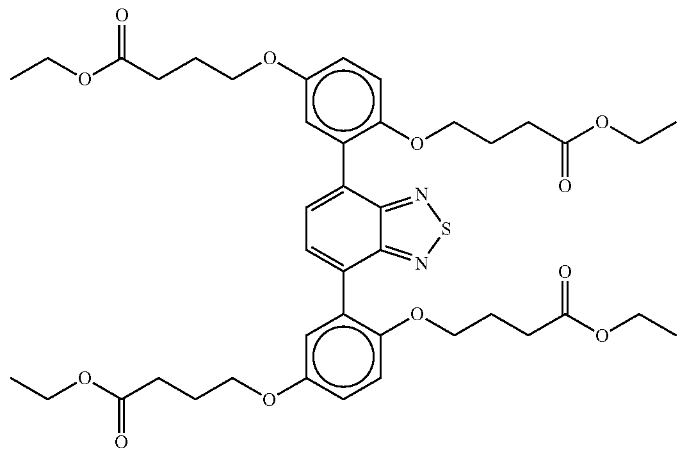

(6)

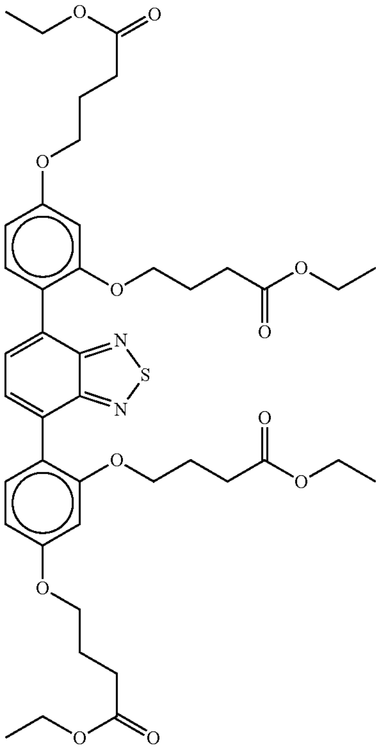

(7)

It is to be noted that for the purpose of the present disclosure, if starting from a solution of copper(II) triflate complexes [Cu(II)], the solution comprising at least one benzothiadiazole having general formula (I) is to be electrochemically reduced in order to obtain a benzothiadiazole having general formula (I) in reduced form ($BTD\cdot^-$), before being fed to the negative compartment.

The aforesaid electrolytes may include at least one supporting electrolyte. The supporting electrolyte is able to maintain a balance of charge between the electrolyte in the negative compartment and the electrolyte in the positive compartment without, however, participating in the reaction. Generally, the supporting electrolyte must be chemically inert in the potential range considered, must have a high ionic conductivity to ensure low resistance to current flow, and must not hinder electronic exchange on the electrode surface.

In accordance with one embodiment of the present disclosure, the above electrolytes comprise at least one supporting electrolyte chosen, for example, from lithium tetrafluoroborate ($LiBF_4$), lithium hexafluorophosphate ($LiPF_6$), lithium perchlorate ($LiClO_4$), methyltrifluoromethanesulfonate ($LiCF_3SO_3$), lithium bis(trifluoromethylsulfonyl)imide [$Li(CF_3SO_2)_2N$], tetraethylammonium tetrafluoroborate ($TEABF_4$), tetrabutylammonium tetrafluoroborate ($TBABF_4$), or mixtures thereof. Lithium tetrafluoroborate ($LiBF_4$), tetrabutylammonium tetrafluoroborate ($TBABF_4$), are preferred.

In accordance with an embodiment of the present disclosure, said organic solvent may be chosen, for example, from acetonitrile, dimethyl acetamide, diethyl carbonate, dimethyl carbonate, γ-butyrolactone (GBL), propylene carbonate (PC), ethylene carbonate (EC), N-methyl-2-pyrrolidone (NMP), fluoroethylene carbonate, N,N-dimethylacetamide, or mixtures thereof. Acetonitrile, propylene carbonate (PC), are preferred.

It should be noted that for the purpose of the present disclosure, it is preferable to use the same solvent in both the positive and negative compartments, so as to prevent possible diffusion problems through the ion exchange membrane with consequent contamination problems between the two compartments.

It should also be noted that both said copper triflate or tetrafluoroborate complexes [Cu(I) or Cu(II)] and said benzothiadiazole having general formula (I) have good solubility in the organic solvent used, i.e. solubility comprised between 0.05 M and 2 M, preferably comprised between 0.08 M and 1.5 M.

In accordance with an embodiment of the present disclosure, said ion exchange membrane may be chosen from polymeric membranes such as, for example:

- ion exchange membranes such as, for example, membranes based on a styrene-divinylbenzene copolymer or a chloromethylstyrene-divinylbenzene copolymer containing amino groups, membranes based on poly(ether ether ketones), membranes based on a divinylbenzene-vinylpyridine copolymer containing a quaternary pyridine group, membranes based on an aromatic polysulfonic copolymer containing a chloromethyl group and amino groups, membranes based on polytetrafluoroethylene (PTFE);
- cation exchange membranes such as, for example, membranes based on a fluoropolymer-copolymer based on tetrafluoroethylene sulfonate, membranes based on poly(ether ether ketones), membranes based on polysulfones, membranes based on polyethylene, membranes based on polypropylene, membranes based on ethylene-propylene copolymers, membranes based on polyimides, membranes based on polyvinyl fluorides.

Anion exchange membranes which may be advantageously used for the purpose of the present disclosure and which are commercially available are NEOSEPTA® AMX, NEOSEPTA® AHA, NEOSEPTA® ACS of Astom, Ionac MA3475 of Lanxess, Teflon® of DuPont, Fumasept® FAA-3 of Fumatech.

Cation exchange membranes which may be advantageously used for the purpose of the present disclosure and which are commercially available are NEOSEPTA® CMX, NEOSEPTA® CIMS, of Astom, Nafion® of DuPont.

Preferably, the negative electrode may comprise at least one metal such as, for example, platinum, copper, aluminum, nickel, stainless steel; or at least one carbon-containing material such as, for example, carbon black, activated carbon, amorphous carbon, graphite, graphene, a carbon nanostructured material; or mixtures thereof. Said negative electrode can be porous, grooved, smooth.

Preferably, the positive electrode may comprise, at least one metal such as, for example, platinum, copper, aluminum, nickel, stainless steel; or at least one carbon-containing material such as, for example, carbon black, activated carbon, amorphous carbon, graphite, graphene, a carbon nanostructured material; or mixtures thereof. Said positive electrode can be porous, grooved, smooth.

Some of the benzothiadiazoles having general formula (I) listed above are new.

Accordingly, the present disclosure also provides a benzothiadiazole having general formula (Ia):

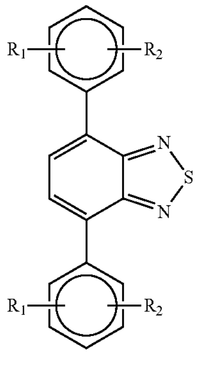

(Ia)

wherein:

$R_1$ and $R_2$, equal or different from each other, represent a hydrogen atom; or represent a $C_1$-$C_{20}$ alkyl group, preferably $C_1$-$C_{10}$, linear or branched, saturated or unsaturated; or represent an —O—$R_3$ group wherein $R_3$ is selected from —$(CH_2)_n$$COOR_4$ groups wherein $R_4$ is selected from $C_1$-$C_{20}$ alkyl groups, preferably $C_1$-$C_{10}$, linear or branched, saturated or unsaturated, and n is an integer comprised between 1 and 10, preferably comprised between 1 and 8, or $R_3$ is selected from —$(CH_2)_n$$OR_4$ groups wherein $R_4$ and n have the same meanings reported above, or $R_3$ is selected from —$(CH_2CH_2O)_n$$R_4$ groups wherein $R_4$ and n have the same meanings reported above, or $R_3$ is selected from —$(CH_2)_n$CN groups wherein n has the same meanings reported above, or $R_3$ is selected from —$(CH_2)_n$$NR_4R_5$ groups wherein $R_4$ and n have the same meanings reported above and $R_5$ is selected from $C_1$-$C_{20}$ alkyl groups, preferably $C_1$-$C_{10}$, linear or branched, saturated or unsaturated, or $R_3$ is selected from —$(CH_2)_n$$CONR_4R_5$ groups wherein $R_4$, $R_5$ and n have the same meanings reported above, or $R_3$ is selected from —$(CH_2)_n$$Si(R_4)_3$ groups wherein $R_4$ and n have the same meanings reported above, or $R_3$ is selected from —$(CH_2)_n$$Si(OR_4)_3$ groups wherein $R_4$ and n have the same meanings reported above;

provided that at least one of $R_1$ and $R_2$ is different from hydrogen and at least one of $R_1$ and $R_2$ is in position 2 of the phenyl.

Benzothiadiazoles having general formula (I) can be synthesised according to procedures known in the art. In particular, compounds (2), (3) and (4) were synthesised by the Suzuki reaction from 2-hydroxyphenylboronic acid and 4,7-dibromobenzothiadiazole to provide 4,7-di(2-hydroxyphenyl)-benzothiadiazole: the Suzuki reaction is very selective and, furthermore, the boronic derivatives are non-toxic, easy to handle and stable. Generally, said Suzuki reaction is catalysed by palladium-based catalysts such as, for example, tetrakistriphenylphosphine palladium(II) $[Pd(PPh_3)_4]$, [1,1' -bis(diphenylphosphino)ferrocene]dichloro-palladium (II) $[Pd(dppf)Cl_2]$, tris(dibenzylideneacetone)-dipalladium (0)/tris(o-tolyl)phosphine $[Pd_2dba_3/P(o\text{-}tolyl)_3]$: specifically, tetrakis(triphenylphosphine)-palladium(II) $[Pd(PPh_3)_4]$ was used as reported, for example, by Ji C. et al. in "*Dyes and Pigments*" (2017), Vol. 140, pg. 203-211. The Suzuki reaction requires a basic environment, for which the most commonly used bases are: alkali metal carbonates (potassium, sodium, caesium), potassium acetate, potassium phosphate, potassium tert-butylate: specifically potassium carbonate was used. The Suzuki reaction can be carried out in the presence of pure organic solvents or mixtures of these such as, for example, dioxane, toluene, tetrahydrofuran, acetonitrile, N,N-dimethylformamide, water, ethyl alcohol, isopropyl alcohol: specifically, it was carried out in the presence of dioxane and water. The Suzuki reaction is generally carried out in an inert atmosphere, at temperatures between 70° C. and 100° C.: specifically, it was carried out at 80° C.-85° C.

The 4,7-di(2-hydroxyphenyl)-benzothiadiazole obtained from the above Suzuki reaction was transformed by the known Williamson etherification reaction, as reported, for example, by Guy K. et al. in "*Journal of Medicinal Chemistry*" (2009), Vol. 52, pg. 3892-3901, in compounds (2), (3) and (4) depending on whether it is reacted with ethyl 4-bromobutyrate to provide compound (2), or with ethyl 2-bromoacetate to provide compound (3), or with 1-bromo-2-(2-methoxyethoxy)ethane to provide compound (4). The Williamson etherification reaction is generally carried out in a basic environment (specifically, it was carried out in the presence of potassium carbonate), and in the presence of dipolar aprotic solvents (specifically, it was carried out in the presence of dimethylformamide). Isolated products were purified by silica gel chromatographic column and the reaction yields ranged from 80% to 95%.

Compounds (5), (6) and (7) were synthesised from the corresponding methoxyl derivatives, prepared by the Suzuki reaction from 4,7-dibromobenzothiadiazole and the corresponding dimethoxy phenylboronic acid, in a manner similar to that reported above for the Suzuki reaction between 2-hydroxyphenylboronic acid and 4,7-dibromobenzothiadiazole. It is known in the literature, as described, for example, by Petronzi C. et al., "*European Journal of Medicinal Chemistry*" (2011), Vol. 46, pg. 488-496) that methoxyl ethers can be demethylated to provide the corresponding hydroxyl by reaction with boron tri-bromide, a product commercially available as a 1 M solution in dichloromethane. Specifically, from 4,7-di(2,6-dimethoxyphenyl)-benzothiadiazole was obtained 4,7-di(2,6-hydroxyphenyl)-benzothiadiazole, from 4,7-di(2,5-dimethoxyphenyl)-benzothiadiazole was obtained 4,7-di(2,5-dihydroxyphenyl)-benzothiadiazole, and from 4,7-di(2,4-dimethoxyphenyl)-benzothiadiazole 4,7-di(2,4-dihydroxyphenyl)-benzothiadiazole was obtained. The corresponding compounds (5), (6) and (7) were obtained from these dihydroxyphenylbenzothiadiazole derivatives by reaction with ethyl 4-bromobutyrate via the Williamson reaction in a basic environment.

Alternatively, the benzothiadiazoles having general formula (I) can be synthesised by micellar synthesis operating as described, for example, by Beverina L. et al. in "*Organic Letters*" (2017), Vol. 19, pg. 654-657. In this regard, for example, with regard to compound (2), 2-(propyloxycarbonylethyloxy)-1-bromobenzene was used as starting material and reacted with pinacol benzothiadiazole-4,7-diboronate, in a solvent consisting of 90% aqueous solution containing 2% Kolliphor and 10% toluene (micellar synthesis), in the presence of [1,1'-bis(di-tert-butylphosphino)ferrocene-dichloro-palladium(II) [Pd(dtbpf)$Cl_2$] as a catalyst, in an environment made basic by tri-ethylamine: the reaction was carried out at 70° C., for 15 minutes. The product (2) was obtained after elution on a silica gel chromatography column with a yield of 90%. The advantages of this reaction are considerable: i) reduction of toxic solvents, the main solvent being water, ii) reduction of reaction times, iii) reduction of reaction temperature, iv) increase in yields. Similarly, this synthetic route was used to prepare the compound (7). Here too, micellar synthesis makes it possible to obtain the desired product in high yields using an environmentally friendly method.

DESCRIPTION OF THE DRAWINGS

The present disclosure will now be illustrated in greater detail through an embodiment with reference to FIG. 1 reported below.

In particular, FIG. 1 schematically represents an embodiment of a non-aqueous redox flow battery (RFB) in accordance with the present disclosure. In this regard, the non-aqueous redox flow battery (RFB) (1) comprises a positive compartment (6*a*) in which a positive electrode (6) is positioned in which a non-aqueous liquid positive electrolyte (not shown in FIG. 1) is made to flow, a negative compartment (8*a*) in which a negative electrode (8) is placed in which a non-aqueous liquid negative electrolyte (not shown in FIG. 1) is made to flow, an ion exchange membrane (7) positioned between the positive compartment (6*a*) and the negative compartment (8*a*).

Figure 1:
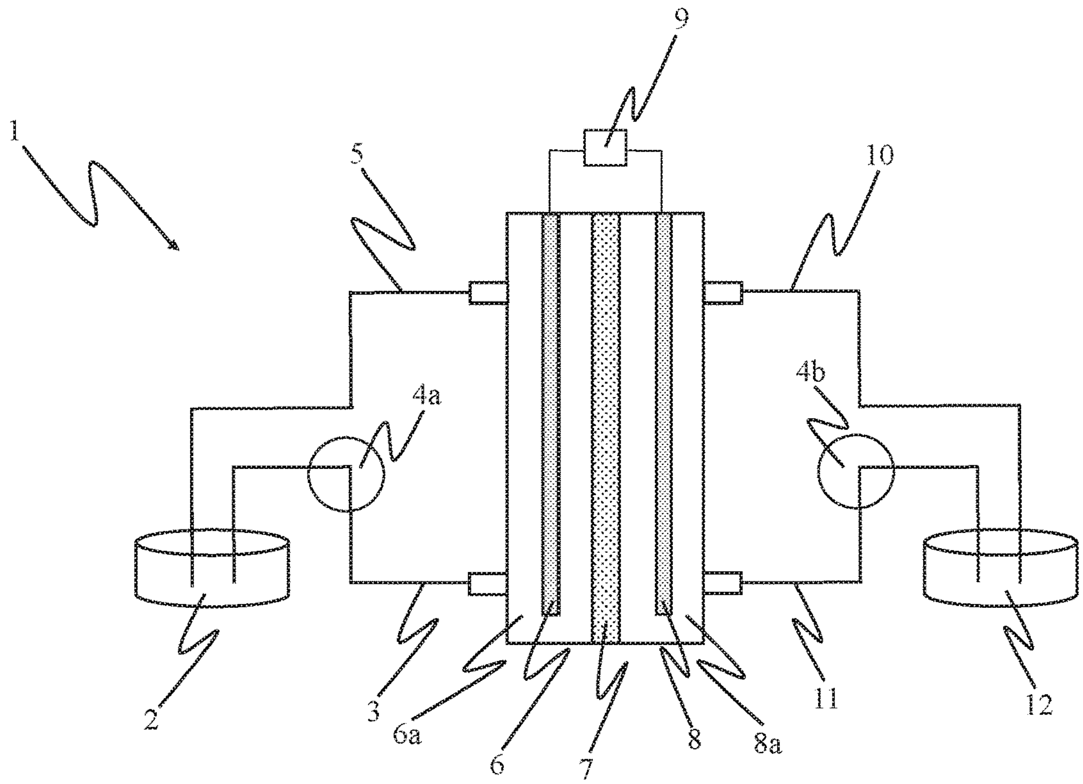
Figure 2:
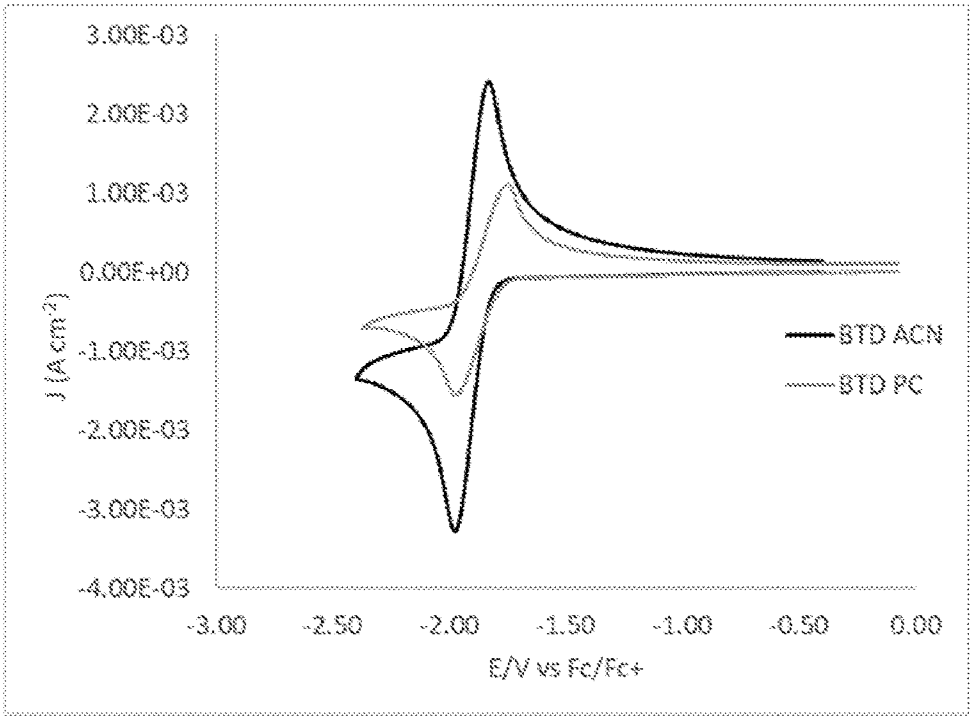
Figure 3:
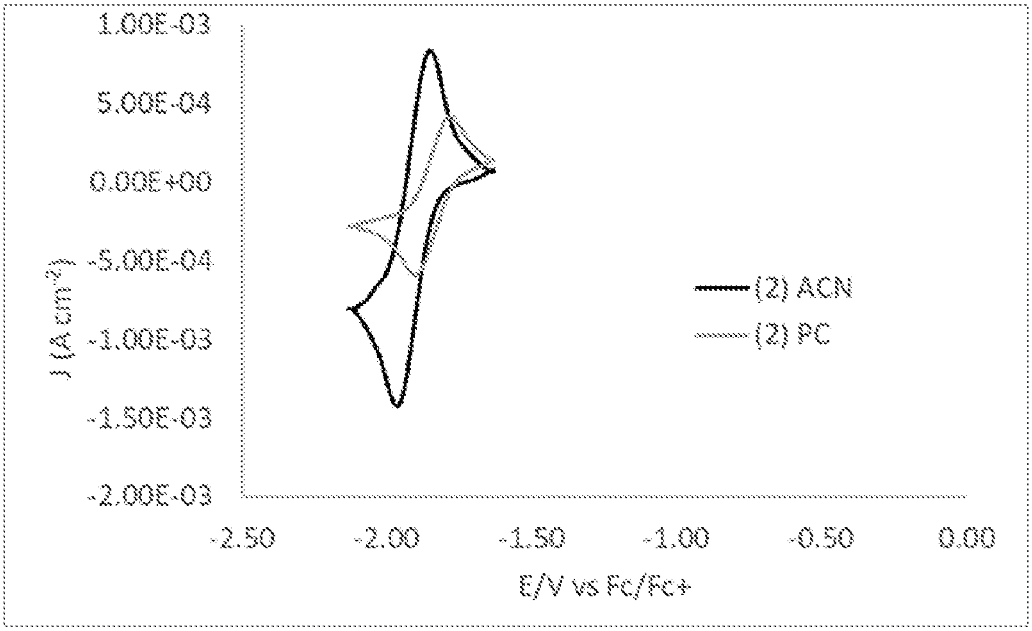
Figure 4:
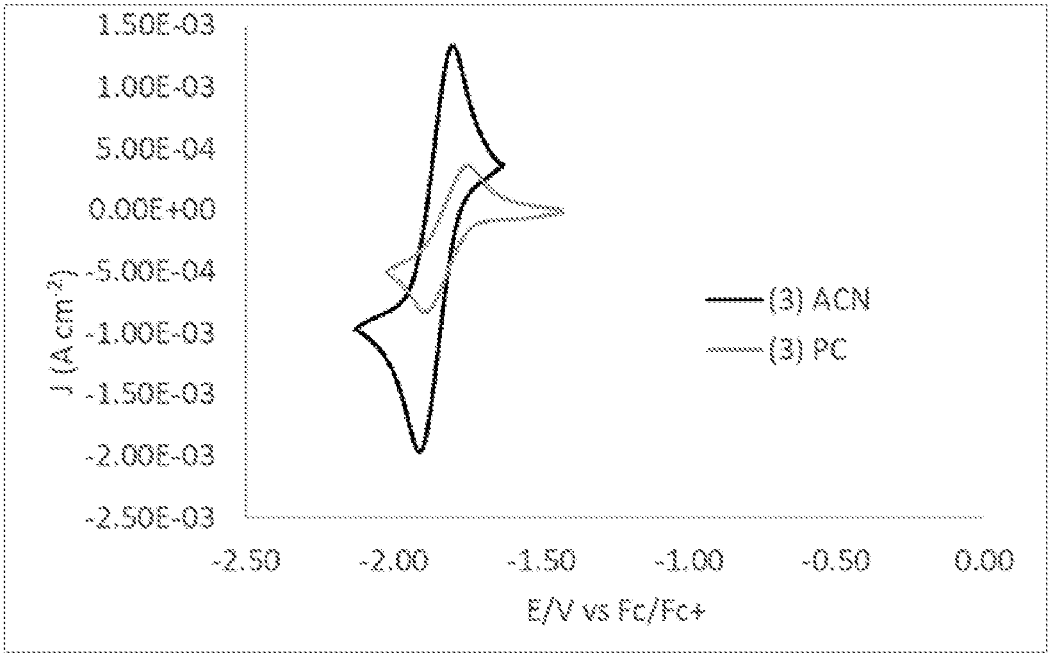
Figure 5:
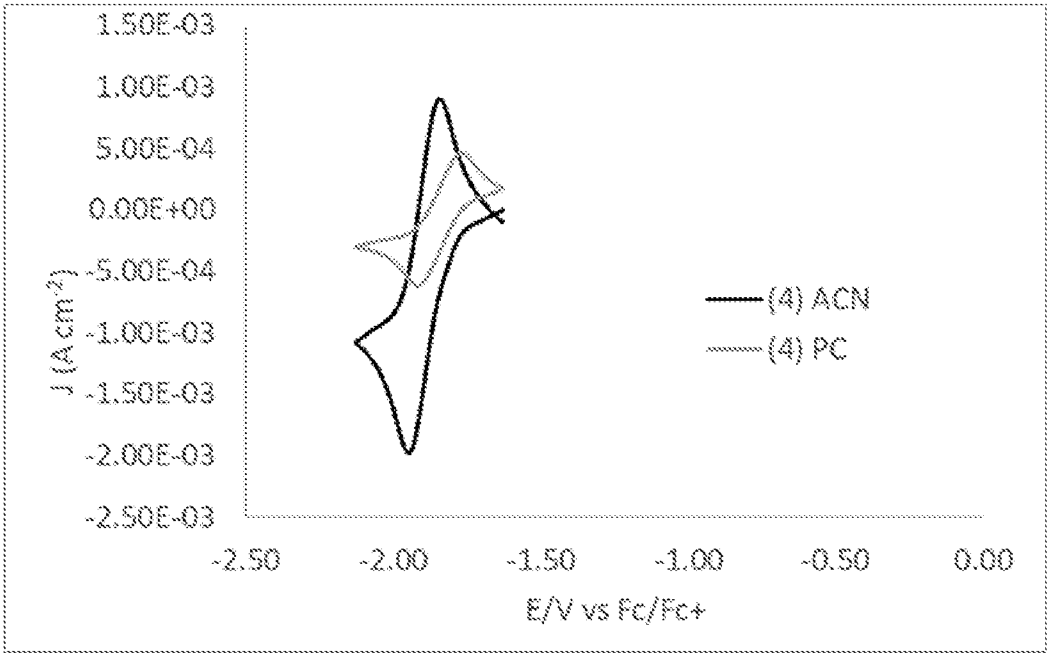
Figure 6:
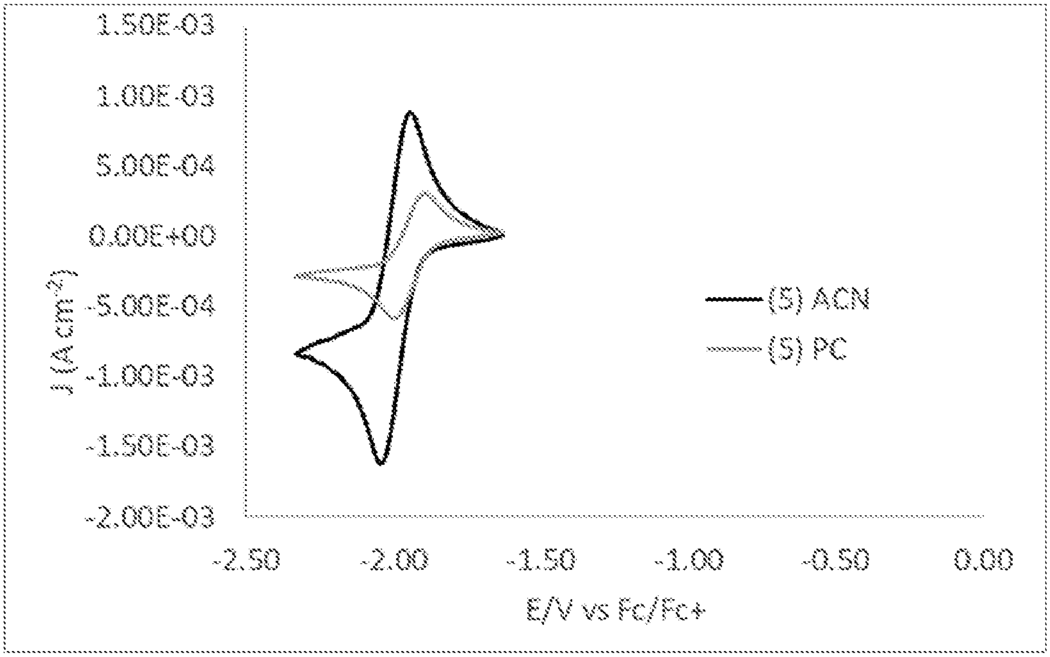
Figure 7:
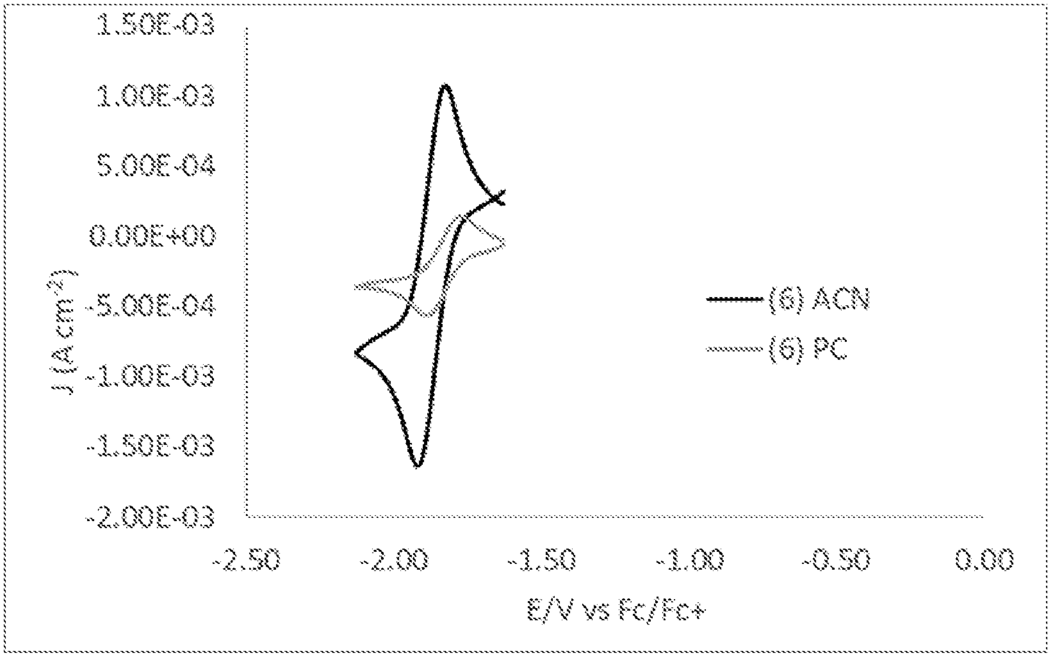
Figure 8:
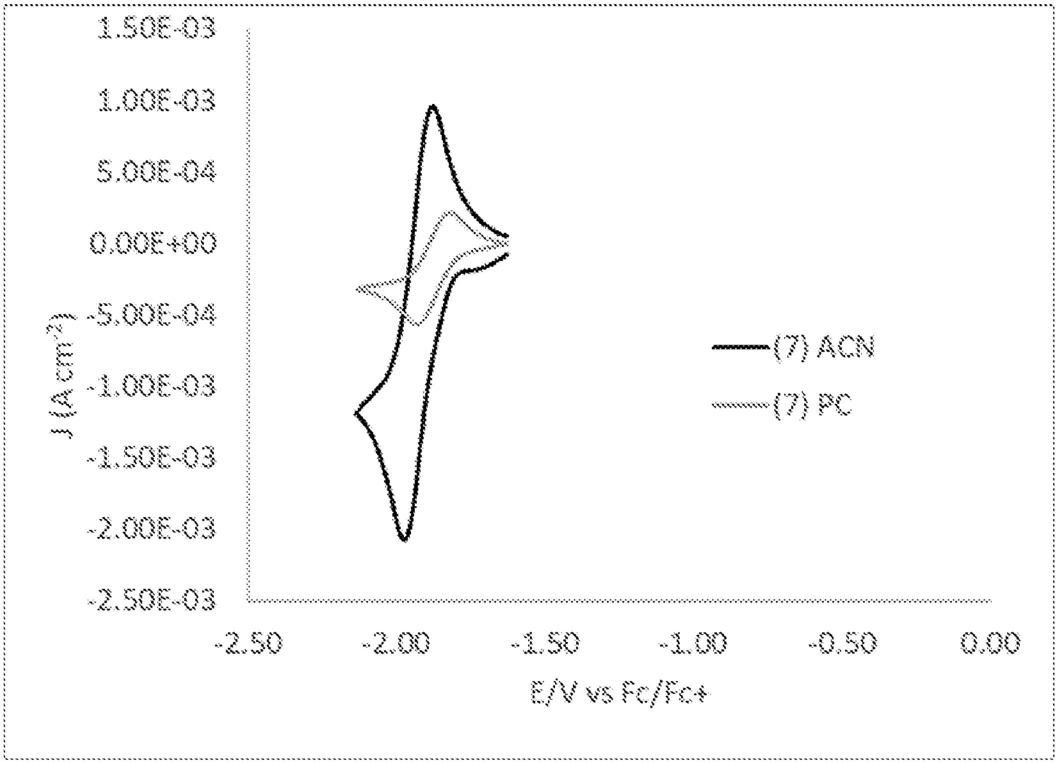

The positive compartment (6*a*) is connected to a reservoir (2) containing the non-aqueous liquid positive electrolyte comprising a solution of copper triflate or tetrafluoroborate complexes [Cu(I) or Cu(II)] in at least one organic solvent, by means of an inlet pipe (3) and a pump (4*a*) (for example, a peristaltic pump) and an outlet pipe (5) so as to allow feeding and discharging of said non-aqueous liquid positive electrolyte during the operating cycle (i.e. during the charge-discharge phase).

The negative compartment (8*a*) is connected to a reservoir (12) containing the non-aqueous liquid negative electrolyte comprising a solution of at least one benzothiadiazole having general formula (I) in at least one organic solvent, by means of an inlet pipe (11) and a pump (4*b*) (for example, a peristaltic pump) and an outlet pipe (10) so as to allow feeding and discharging of said non-aqueous liquid negative electrolyte during the operating cycle (i.e. during the charge-discharge phase).

A voltmeter (9) is connected to the positive electrode (6) and to the negative electrode (8).

During the charging phase of the non-aqueous redox flow battery (RFB) (1), a potential difference is applied between the positive and negative electrodes by means of the voltmeter (9) while simultaneously the non-aqueous liquid positive electrolyte is supplied, via the pump (4*a*) from the positive electrolyte reservoir (2) to the positive compartment (6*a*) and the non-aqueous liquid negative electrolyte is supplied, via the pump (4*b*) from the negative electrolyte reservoir (12) to the negative compartment (8*a*). Said non-aqueous liquid positive electrolyte present in the positive compartment (6*a*) undergoes an oxidation reaction at the positive electrode (6) and said non-aqueous liquid negative electrolyte present in the negative compartment (8*a*) undergoes a reduction reaction at the negative electrode (8): through the ion exchange membrane (7) there is a flow of the ions involved in the aforementioned oxidation and reduction reactions in opposite directions in order to balance the charges. During the discharge phase of the non-aqueous redox flow battery (RFB) (1), reverse reactions take place. The above-mentioned charging phase and discharging phase can be summarised as follows:

negative electrode:

$$BTD + e^- \underset{scarica}{\overset{carica}{\rightleftharpoons}} BTD^{\bullet -}$$

positive electrode:

$$Cu^+ \underset{scarica}{\overset{carica}{\rightleftharpoons}} Cu^{2+} + e^-$$

cell:

$$BTD + Cu^+ \underset{scarica}{\overset{carica}{\rightleftharpoons}} BTD^{\bullet -} + Cu^{2+}$$

wherein:

"carica": charge;

"scarica": discharge;

BTD=benzothiadiazole having general formula (I);

Cu=copper;

$e^-$=electrons.

During the operating cycle (i.e. during the charge-discharge phase) both the non-aqueous liquid positive electrolyte and the non-aqueous liquid negative electrolyte are continuously pumped into the positive and negative compartments, respectively, in order to continuously supply said positive and negative compartments.

The energy stored in the non-aqueous (1) redox flow battery (RFB) can be directly used for the operation of the apparatus in which it is inserted, or it can be transferred to an electrical network during periods of peak use to supplement the power supply. An alternating current/direct current (AC/DC) converter (not shown in FIG. 1) may optionally be used to facilitate the transfer of energy to and from an alternating current (AC) supply network.

The present disclosure will be further illustrated below by means of the following examples, which are provided for indicative purposes only and without limitation of this disclosure.

EXAMPLE 1

Synthesis of 4,7-di[2-(methoxycarbonylethyloxy) phenyl]-benzothiadiazole [Compound (3)]

(3)

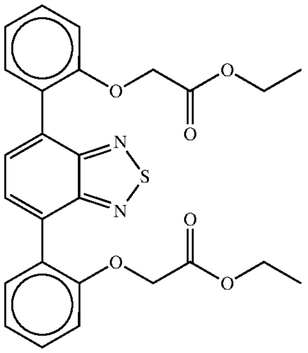

Synthesis of 4,7-di(2-hydroxyphenyl)-benzothiadiazole

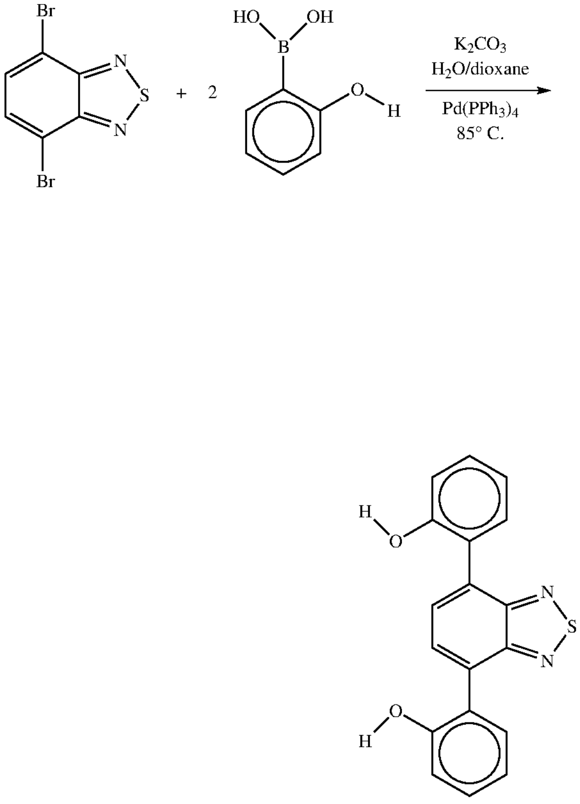

In a 100-ml round-bottom flask, equipped with mechanical stirrer, thermometer and coolant, in an inert atmosphere, at room temperature (25° C.), under stirring, to a 0.08 M solution in dioxane (Aldrich) of 4,7-dibromobenzothiadiazole (Aldrich) (990 mg; 3.37 mmol) the following were added, in order: 2-hydroxyphenylboronic acid (Aldrich) (2 g; 9.1 mmol), potassium carbonate ($K_2CO_3$) (Aldrich) (3.7 g; 27 mmol) and distilled water (12 ml). After removing oxygen from the reaction environment by 3 vacuum/nitrogen cycles, tetrakis(triphenylphosphine)palladium(II) [$Pd(PPh_3)_4$] (Aldrich) (200 mg; 0.17 mmol) was added: the flask was immersed in an oil bath preheated to 85° C. and left at said temperature, under stirring, for 20 hours. Then, distilled water (50 ml) was added and everything was extracted with ethyl ether (Aldrich) (3×100 ml): the organic phases obtained were combined, washed with a saturated aqueous solution of sodium chloride (Aldrich) until neutral and anhydrified on sodium sulphate (Aldrich). After removal of the solvent by distillation under reduced pressure, the residue obtained was purified by elution on a silica gel chromatography column [eluent: heptane (Aldrich)/dichloromethane (Aldrich)/ethyl acetate (Aldrich) in a gradient from 91/6/3 to 82/12/6 to 70/20/10], yielding 986 mg of 4,7-di(2-hydroxyphenyl)-benzothiadiazole (yield=91%).

Synthesis of 4,7-di[2-(methoxycarbonylethyloxy)phenyl]-benzothiadiazole [Compound (3)]

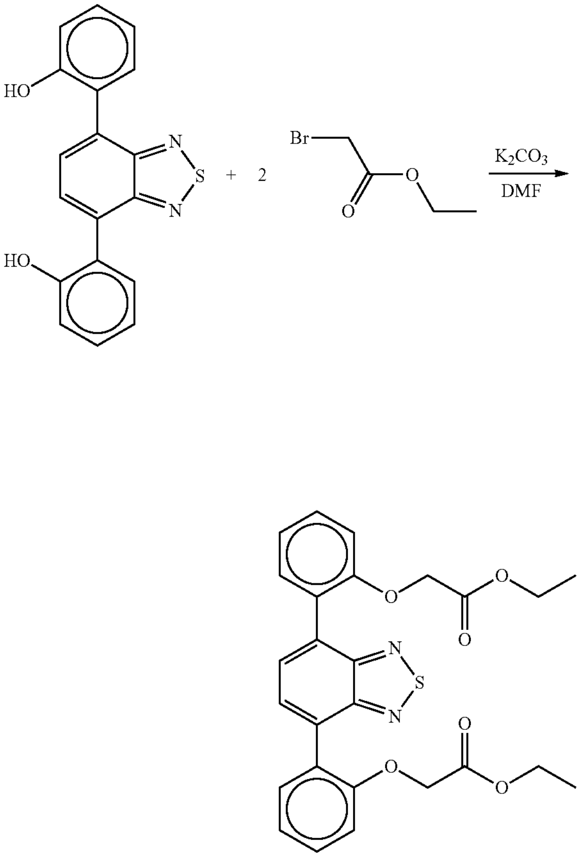

(3)

In a 100 ml round-bottom flask, equipped with mechanical stirrer, thermometer and coolant, in an inert atmosphere, at room temperature (25° C.), under stirring, to a 0.05 M solution in N,N-dimethylformamide (DMF) (Aldrich) of 4,7-di(2-hydroxyphenyl)-benzothiadiazole (157.22 mg; 0.49 mmol) obtained as described above, potassium carbonate ($K_2CO_3$) (Aldrich) (276 mg; 2 mmol) and, after 5 minutes, ethyl 2-bromoacetate (Aldrich) (220 µl; 334 mg; 2 mmol) were added: the flask was immersed in an oil bath preheated to 80° C. and left at said temperature, under stirring, for 12 hours. Then, distilled water (100 ml) was added and everything was extracted with ethyl ether (Aldrich) (3×100 ml): the organic phases obtained were combined, washed with a saturated aqueous solution of sodium chloride (Aldrich) until neutral and anhydrified on sodium sulphate (Aldrich). After removal of the solvent by distillation under reduced pressure, the residue obtained was purified by elution on a silica gel chromatography column [eluent: heptane (Aldrich)/dichloromethane (Aldrich)/ethyl acetate (Aldrich) in a gradient from 91/6/3 to 82/12/6], yielding 229 mg of 4,7-di[2-(methoxycarbonylethyloxy)phenyl]-benzothiadiazole [Compound (3) (yield=95%)].

EXAMPLE 2

Synthesis of 4,7-di[2-(propyloxycarbonylethyloxy)phenyl]-benzothiadiazole [Compound (2)]

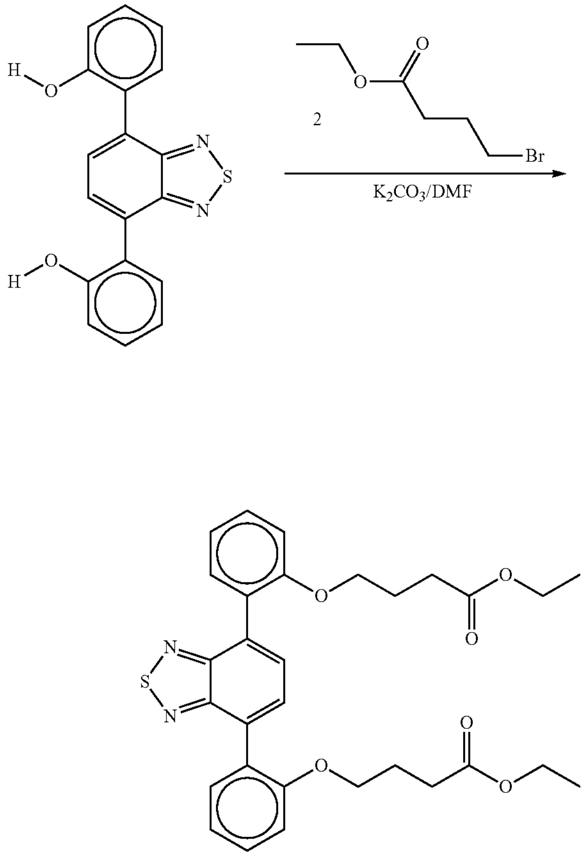

(2)

In a 100 ml round-bottom flask, equipped with mechanical stirrer, thermometer and coolant, in an inert atmosphere, at room temperature (25° C.), under stirring, to a 0.2 M solution in N,N-dimethylformamide (DMF) (Aldrich) of 4,7-di(2-hydroxyphenyl)-benzothiadiazole (986 mg; 3.06 mmol) obtained as described in Example 1, potassium carbonate ($K_2CO_3$) (Aldrich) (972 mg; 7.03 mmol) and, after 5 minutes, ethyl 4-bromobutyrate (Aldrich) (970 µl; 1322 mg; 6.73 mmol) were added: the flask was immersed in an oil bath preheated to 80° C. and left at said temperature, under stirring, for 12 hours. Then, distilled water (100 ml) was added and everything was extracted with ethyl acetate (Aldrich) (3×100 ml): the organic phases obtained were combined, washed with a saturated aqueous solution of sodium chloride (Aldrich) until neutral and anhydrified on sodium sulphate (Aldrich). After removal of the solvent by distillation under reduced pressure, the residue obtained was purified by elution on a silica gel chromatography column [eluent: heptane (Aldrich)/ethyl acetate (Aldrich) in a gradient from 80/20 to 70/30], yielding 1300 mg of 4,7-di[2-(propyloxycarbonylethyloxy)phenyl]-benzothiadiazole [Compound (2) (yield=80%)].

EXAMPLE 3

Synthesis of 4,7-di[2-(2-(2-methoxyethoxy)ethoxy)phenyl]-benzothiadiazole [Compound (4)]

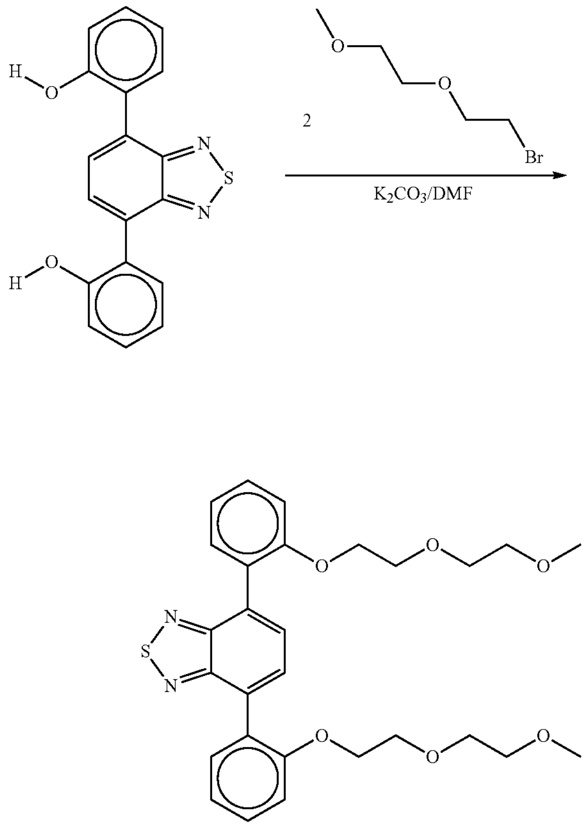

(4)

In a 100 ml round-bottom flask, equipped with mechanical stirrer, thermometer and coolant, in an inert atmosphere, at room temperature (25° C.), under stirring, to a 0.08 M solution in N,N-dimethylformamide (DMF) (Aldrich) of 4,7-di(2-hydroxyphenyl)-benzothiadiazole (260 mg; 0.81 mmol) obtained as described in Example 1, potassium carbonate ($K_2CO_3$) (Aldrich) (334 mg; 2.42 mmol) and, after 5 minutes, 1-bromo-2-(2-methoxyethoxy)ethane (Aldrich) (323 μl; 440 mg; 2.42 mmol) were added: the flask was immersed in an oil bath preheated to 80° C. and left at said temperature for 12 hours. Then, distilled water (50 ml) was added and everything was extracted with ethyl acetate (Aldrich) (3×50 ml): the organic phases obtained were combined, washed with a saturated aqueous solution of sodium chloride (Aldrich) until neutral and anhydrified on sodium sulphate (Aldrich). After removal of the solvent by distillation under reduced pressure, the residue obtained was purified by elution on a silica gel chromatography column [eluent: heptane (Aldrich)/ethyl acetate (Aldrich) in a gradient from 80/20 to 70/30 to 60/40], yielding 340 mg of 4,7-di[2-(2-(2-methoxyethoxy)ethoxy)phenyl]-benzothiadiazole [Compound (4) (yield=80%)].

EXAMPLE 4

Synthesis of 4,7-di[2,6-di(propyloxycarbonylethyloxy)phenyl]-benzothiadiazole [Compound (5)]

Synthesis of 4,7-di(2,6-dimethoxyphenyl)-benzothiadiazole

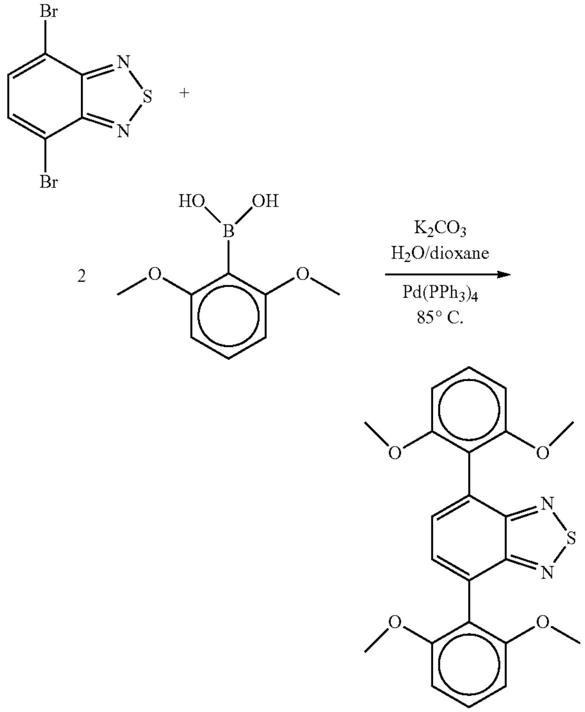

In a 100-ml round-bottom flask, equipped with mechanical stirrer, thermometer and coolant, in an inert atmosphere, at room temperature (25° C.), under stirring, to a 0.08 M solution in dioxane (Aldrich) of 4,7-dibromobenzothiadiazole (Aldrich) (500 mg; 1.7 mmol) the following were added, in order: 2,6-dimethoxyphenylboronic acid (Aldrich) (1000 mg; 4.6 mmol), potassium carbonate ($K_2CO_3$) (Aldrich) (1.88 g; 13.6 mmol) and distilled water (7 ml). After removing oxygen from the reaction environment by 3 vacuum/nitrogen cycles, tetrakis(triphenylphosphine)palladium(II) [$Pd(PPh_3)_4$] (Aldrich) (100 mg; 0.086 mmol) was added: the flask was immersed in an oil bath preheated to 85° C. and left at said temperature, under stirring, for 20 hours. Then, distilled water (50 ml) was added and everything was extracted with ethyl ether (Aldrich) (3×50 ml): the organic phases obtained were combined, washed with distilled water until neutral and anhydrified on sodium sulphate (Aldrich). After removal of the solvent by distillation under reduced pressure, the residue obtained was purified by elution on a silica gel chromatography column [eluent: heptane (Aldrich)/dichloromethane (Aldrich) in a gradient from 100/0 to 95/5 to 90/10 to 85/15], yielding 460 mg of 4,7-di(2,6-dimethoxyphenyl)-benzothiadiazole (yield=66%).

Synthesis of 4,7-di(2,6-dihydroxyphenyl)-benzothiadiazole

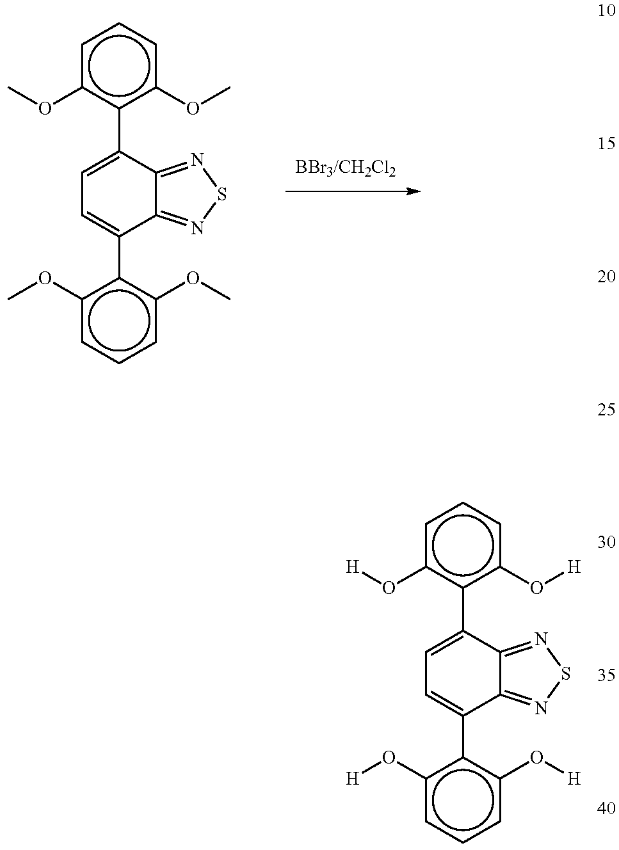

In a 100 ml round-bottom flask, equipped with mechanical stirrer, thermometer and coolant, in an inert atmosphere, at −78° C., under stirring, to a 0.09 M solution in anhydrous dichloromethane ($CH_2Cl_2$) (Aldrich) of 4,7-di(2,6-dimethoxyphenyl)-benzothiadiazole (439 mg; 1.07 mmol) obtained as described above, a 1M solution of boron tribromide ($BBr_3$) (Aldrich) in anhydrous dichloromethane ($CH_2Cl_2$) (Aldrich) (16 ml; 16 mmol) was added by slow drip: the temperature was allowed to rise slowly and spontaneously to room temperature (25° C.). After cooling the mixture to −78° C., ethanol (Aldrich) (25 ml) was added by slow drip. Then, after bringing the temperature back to room temperature (25° C.) and removing the solvent by distillation under reduced pressure, distilled water (50 ml) was added and everything was extracted with ethyl acetate (Aldrich) (3×50 ml): the organic phases obtained were combined, washed with an aqueous solution of sodium chloride (Aldrich) until neutral and anhydrified on sodium sulphate (Aldrich). The residue obtained was purified by elution on a silica gel chromatography column (eluent: heptane (Aldrich)/ethyl acetate (Aldrich) in a ratio 60/40 v/v), yielding 289.4 mg of 4,7-di(2,6-dihydroxyphenyl)-benzothiadiazole (yield=77%).

Synthesis of 4,7-di[2,6-di(propyloxycarbonylethyloxy)phenyl]-benzothiadiazole [Compound (5)]

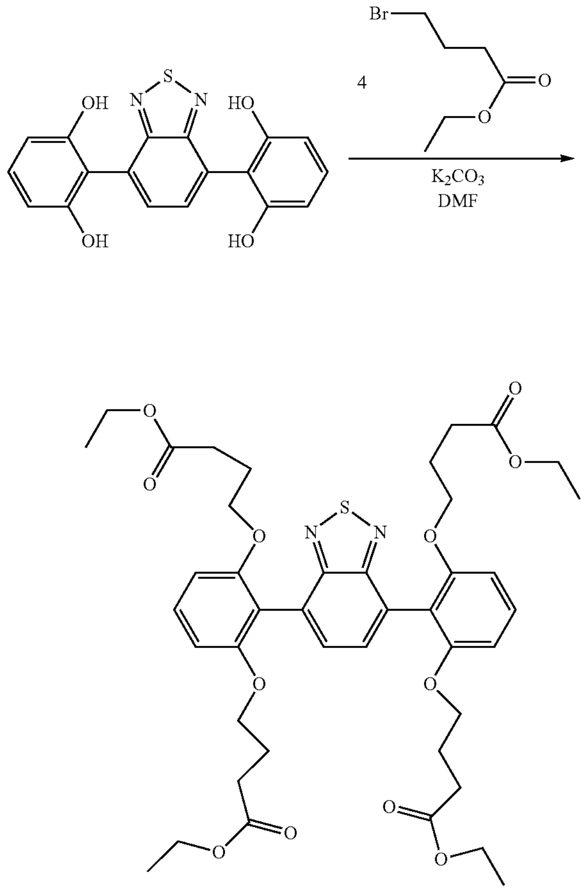

(5)

In a 100 ml round-bottom flask, equipped with mechanical stirrer, thermometer and coolant, in an inert atmosphere, at room temperature (25° C.), under stirring, to a 0.05 M solution in N,N-dimethylformamide (DMF) (Aldrich) of 4,7-di(2,6-dihydroxyphenyl)-benzothiadiazole (289.4 mg; 0.82 mmol) obtained as described above, potassium carbonate ($K_2CO_3$) (Aldrich) (959 mg; 4.9 mmol) and, after 5 minutes, ethyl 4-bromobutyrate (Aldrich) (704 μl; 1322 mg; 4.9 mmol) were added: the flask was immersed in an oil bath preheated to 80° C. and left at said temperature, under stirring, for 12 hours. Then, distilled water (50 ml) was added and everything was extracted with ethyl acetate (Aldrich) (3×50 ml): the organic phases obtained were combined, washed with distilled water until neutral and anhydrified on sodium sulphate (Aldrich). After removal of the solvent by distillation under reduced pressure, the residue obtained was purified by elution on a silica gel chromatography column (eluent: heptane (Aldrich)/ethyl acetate (Aldrich) in a ratio 70/30 v/v), yielding 380 mg of 4,7-di[2,6-di(propyloxycarbonylethyloxy)phenyl]-benzothiadiazole [Compound (5) (yield=57%)].

EXAMPLE 5

Synthesis of 4,7-di[2,5-di(propyloxycarbonylethyloxy)phenyl]-benzothiadiazole [Compound (6)]

Synthesis of 4,7-di(2,5-dimethoxyphenyl)benzothiadiazole

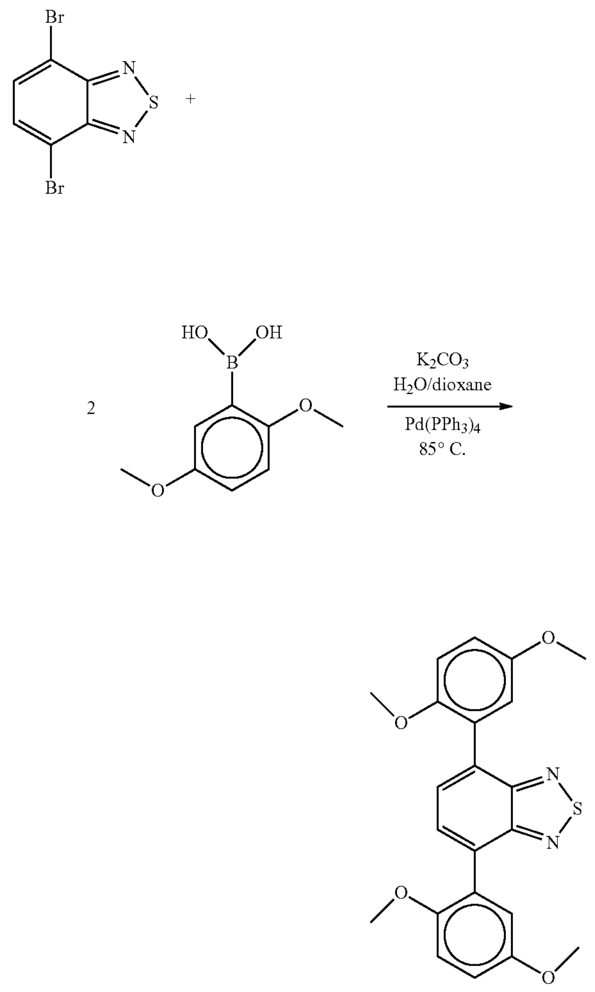

In a 100-ml round-bottom flask, equipped with mechanical stirrer, thermometer and coolant, in an inert atmosphere, at room temperature (25° C.), under stirring, to a 0.08 M solution in dioxane (Aldrich) of 4,7-dibromobenzothiadiazole (Aldrich) (700 mg; 2.4 mmol) the following were added, in order: 2,5-dimethoxyphenylboronic acid (Aldrich) (1180 mg; 6.5 mmol), potassium carbonate ($K_2CO_3$) (Aldrich) (2.65 g; 19.2 mmol) and distilled water (10 ml). After removing oxygen from the reaction environment by 3 vacuum/nitrogen cycles, tetrakis(triphenylphosphine)palladium(II) [$Pd(PPh_3)_4$] (Aldrich) (140 mg; 0.121 mmol) was added: the flask was immersed in an oil bath preheated to 85° C. and left at said temperature, under stirring, for 20 hours. Then, distilled water (100 ml) was added and everything was extracted with ethyl ether (Aldrich) (3×100 ml): the organic phases obtained were combined, washed with distilled water until neutral and anhydrified on sodium sulphate. After removal of the solvent by distillation under reduced pressure, the residue obtained was purified by elution on a silica gel chromatography column (eluent: heptane (Aldrich)/dichloromethane (Aldrich) in a gradient from 100/0 to 95/5 to 90/10 to 85/15), yielding 880 mg of 4,7-di(2,5-dimethoxyphenyl)-benzothiadiazole (yield=90%).

Synthesis of 4,7-di(2,5-dihydroxyphenyl)-benzothiadiazole

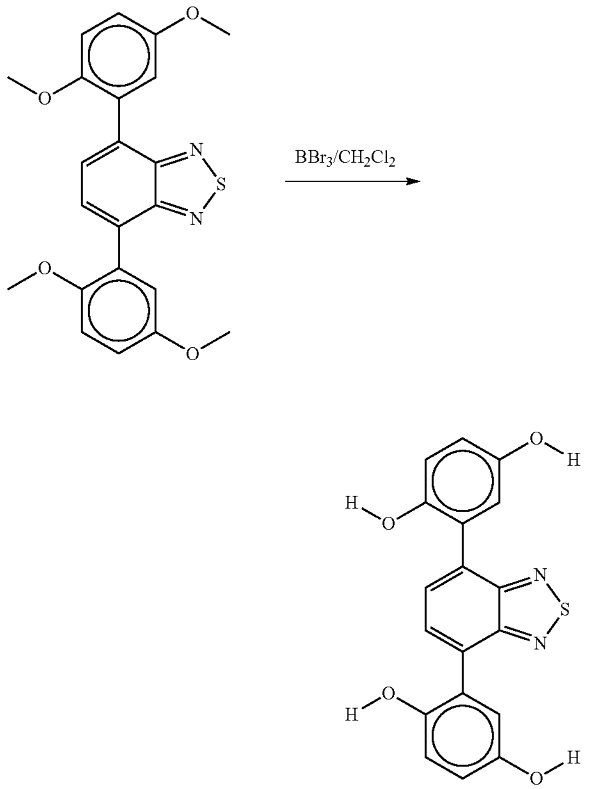

In a 100 ml round-bottom flask, equipped with mechanical stirrer, thermometer and coolant, in an inert atmosphere, at −78° C., under stirring, to a 0.09 M solution in anhydrous dichloromethane ($CH_2Cl_2$) (Aldrich) of 4,7-di(2,5-dimethoxyphenyl)-benzothiadiazole (738 mg; 1.8 mmol) obtained as described above, a 1 M solution of boron tri-bromide ($BBr_3$) (Aldrich) in anhydrous dichloromethane ($CH_2Cl_2$) (Aldrich) (27 ml; 27 mmol) was added by slow drip: the temperature was allowed to rise slowly and spontaneously to room temperature (25° C.). After cooling the mixture to −78° C., ethanol (25 ml) was added by slow drip. Then, after bringing the temperature back to room temperature (25° C.) and removing the solvent by distillation under reduced pressure, distilled water (50 ml) was added and everything was extracted with ethyl acetate (Aldrich) (3×50 ml): the organic phases obtained were combined, washed with an aqueous solution of sodium chloride (Aldrich) until neutral and anhydrified on sodium sulphate. The residue obtained was purified by elution on a silica gel chromatography column (eluent: heptane (Aldrich)/ethyl acetate (Aldrich) in a ratio 60/40 v/v), yielding 557.4 mg of 4,7-di(2,5-dihydroxyphenyl)-benzothiadiazole (yield=87.2%).

Synthesis of 4,7-di[2,5-di(propyloxycarbonylethyloxy)phenyl]-benzothiadiazole [Compound (6)]

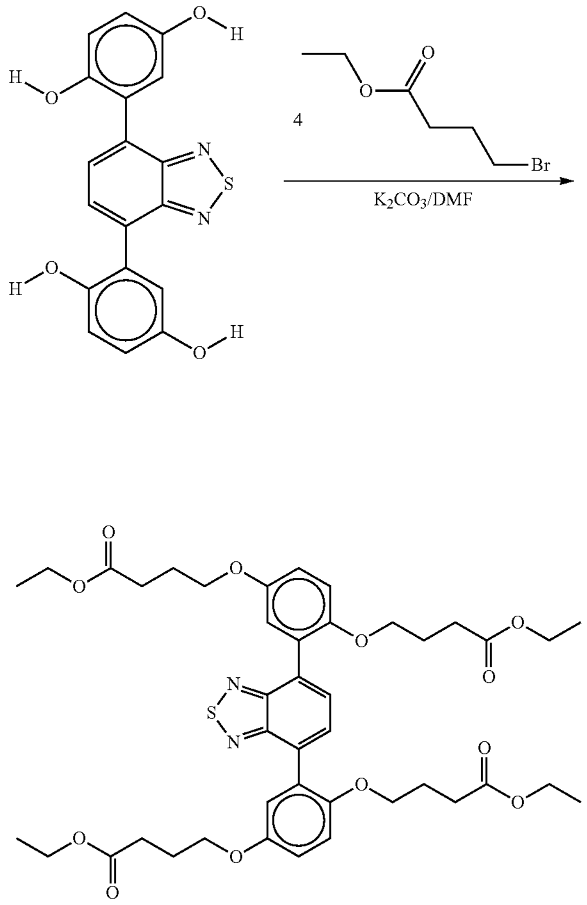

(6)

In a 100 ml round-bottom flask, equipped with mechanical stirrer, thermometer and coolant, in an inert atmosphere, at room temperature (25° C.), under stirring, to a 0.1 M solution in N,N-dimethylformamide (DMF) (Aldrich) of 4,7-di(2,5-dihydroxyphenyl)-benzothiadiazole (557.4 mg; 1.57 mmol) obtained as described above, potassium carbonate ($K_2CO_3$) (Aldrich) (1300 mg; 9.4 mmol) and, after 5 minutes, ethyl 4-bromobutyrate (1.35 ml; 1322 mg; 9.4 mmol) were added: the flask was immersed in an oil bath preheated to 85° C. and left at said temperature, under stirring, for 12 hours. Then, distilled water (50 ml) was added and everything was extracted with ethyl acetate (Aldrich) (3×50 ml): the organic phases obtained were combined, washed with distilled water until neutral and anhydrified on sodium sulphate. After removal of the solvent by distillation under reduced pressure, the residue obtained was purified by elution on a silica gel chromatography column (eluent: heptane (Aldrich)/ethyl acetate (Aldrich) in a ratio 70/30 v/v), yielding 888 mg of 4,7-di[2,5-di(propyloxycarbonylethyloxy)phenyl]-benzothiadiazole [Compound (6) (yield=70%)].

EXAMPLE 6

Synthesis of 4,7-di[2,4-di(propyloxycarbonylethyloxy)phenyl]-benzothiadiazole [Compound (7)]

Synthesis of 4,7-di(2,4-dimethoxyphenyl)-benzothiadiazole

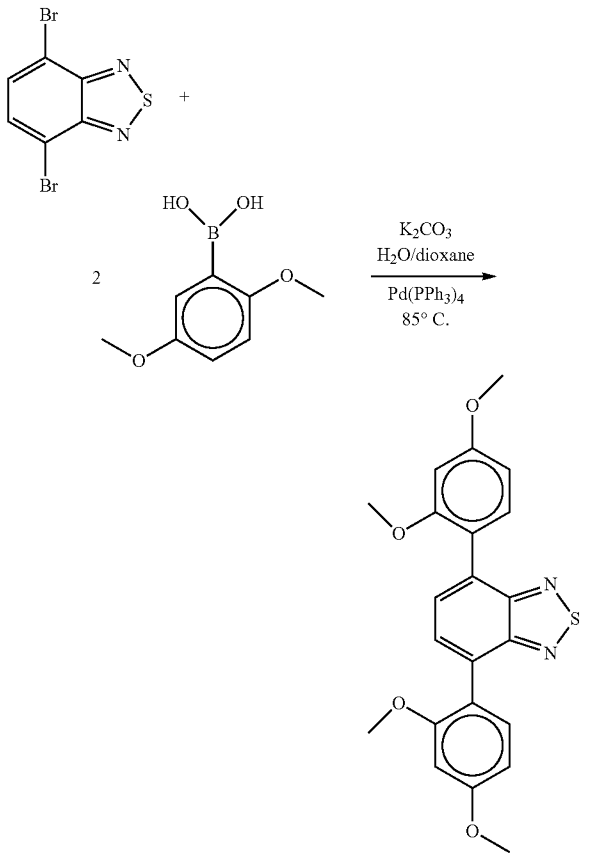

In a 100-ml round-bottom flask, equipped with mechanical stirrer, thermometer and coolant, in an inert atmosphere, at room temperature (25° C.), under stirring, to a 0.08 M solution in dioxane (Aldrich) of 4,7-dibromobenzothiadiazole (Aldrich) (705 mg; 2.4 mmol) the following were added, in order: 2,4-dimethoxyphenylboronic acid (Aldrich) (1170 mg; 6.43 mmol), potassium carbonate ($K_2CO_3$) (Aldrich) (6.5 g; 19.2 mmol) and distilled water (10 ml). After removing oxygen from the reaction environment by 3 vacuum/nitrogen cycles, tetrakis(triphenylphosphine)palladium(II) [$Pd(PPh_3)_4$](Aldrich) (140 mg; 0.121 mmol) was added: the flask was immersed in an oil bath preheated to 85° C. and left at said temperature, under stirring, for 20 hours. Then, distilled water (50 ml) was added and everything was extracted with ethyl ether (Aldrich) (3×50 ml): the organic phases obtained were combined, washed with distilled water until neutral and anhydrified on sodium sulphate (Aldrich). After removal of the solvent by distillation under reduced pressure, the residue obtained was purified by elution on a silica gel chromatography column (eluent: heptane (Aldrich)/dichloromethane (Aldrich) in a gradient from 100/0 to 95/5 to 90/10 to 85/15 to 80/20 to 70/30), yielding 832 mg of 4,7-di(2,4-dimethoxyphenyl)-benzothiadiazole (yield=85%).

Synthesis of 4,7-di(2,4-dihydroxyphenyl)-benzothiadiazole

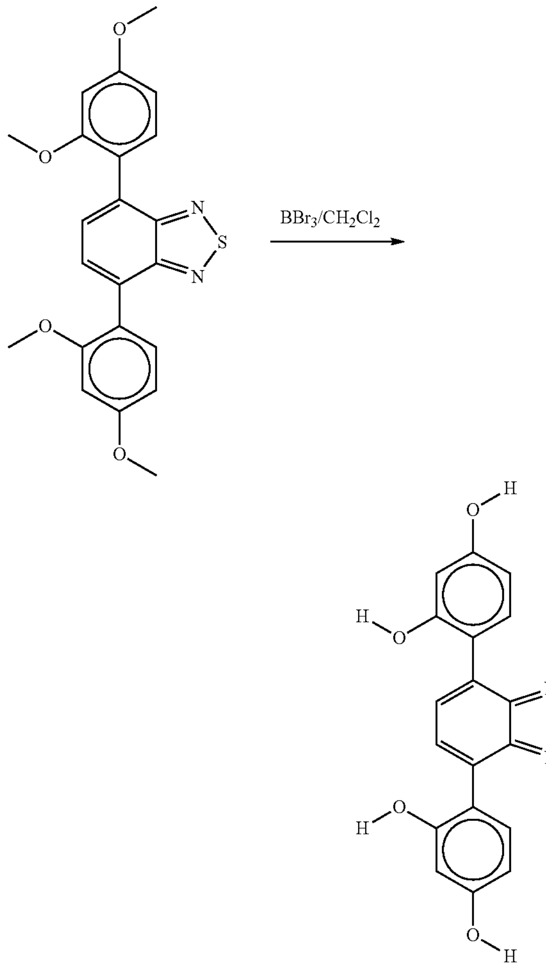

In a 100 ml round-bottom flask, equipped with mechanical stirrer, thermometer and coolant, in an inert atmosphere, at −78° C., under stirring, to a 0.09 M solution in anhydrous dichloromethane ($CH_2Cl_2$) (Aldrich) of 4,7-di(2,4-dimethoxyphenyl)-benzothiadiazole (330 mg; 0.8 mmol) obtained as described above, a 1 M solution of boron tri-bromide ($BBr_3$) (Aldrich) in anhydrous dichloromethane ($CH_2Cl_2$) (Aldrich) (12 ml; 12 mmol) was added by slow drip: the temperature was allowed to rise slowly and spontaneously to room temperature (25° C.). After cooling the mixture to −78° C., ethanol (Aldrich) (25 ml) was added by slow drip. Then, after bringing the temperature back to room temperature (25° C.) and removing the solvent by distillation under reduced pressure, distilled water (50 ml) was added and everything was extracted with ethyl acetate (Aldrich) (3×50 ml): the organic phases obtained were combined, washed with an aqueous solution of sodium chloride (Aldrich) until neutral and anhydrified on sodium sulphate (Aldrich). The residue obtained was purified by elution on a silica gel chromatography column (eluent: heptane (Aldrich)/ethyl acetate (Aldrich) in a ratio 60/40 v/v), yielding 270 mg of 4,7-di(2,4-dihydroxyphenyl)-benzothiadiazole (yield=95%).

Synthesis of 4,7-di[2,4-di(propyloxycarbonylethyloxy)phenyl]-benzothiadiazole [Compound (7)]

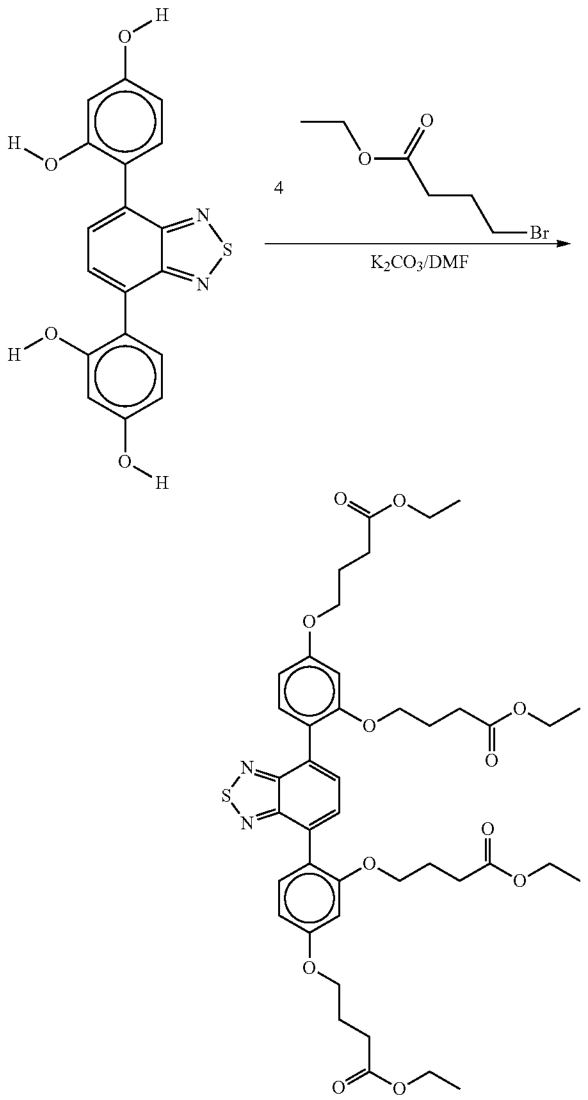

(7)

In a 100 ml round-bottom flask, equipped with mechanical stirrer, thermometer and coolant, in an inert atmosphere, at room temperature (25° C.), under stirring, to a 0.076 M solution in N,N-dimethylformamide (DMF) (Aldrich) of 4,7-di(2,4-dihydroxyphenyl)-benzothiadiazole (268 mg; 0.76 mmol) obtained as described above, potassium carbonate ($K_2CO_3$) (Aldrich) (626 mg; 4.54 mmol) and, after 5 minutes, ethyl 4-bromobutyrate (Aldrich) (652 μl; 889 mg; 4.54 mmol) were added: the flask was immersed in an oil bath preheated to 80° C. and left at said temperature, under stirring, for 12 hours. Then, distilled water (50 ml) was added and everything was extracted with ethyl acetate (Aldrich) (3×50 ml): the organic phases obtained were combined, washed with distilled water until neutral and anhydrified on sodium sulphate (Aldrich). After removal of the solvent by distillation under reduced pressure, the residue obtained was purified by elution on a silica gel chromatography column (eluent: heptane (Aldrich)/ethyl acetate (Aldrich) in a ratio 70/30 v/v), yielding 490 mg of 4,7-di [2,4-di(propyloxycarbonylethyloxy)phenyl]-benzothiadiazole [Compound (7) (yield=80%)].

EXAMPLE 7

Synthesis of 4,7-di[2-(propyloxycarbonylethyloxy) phenyl]-benzothiadiazole [Compound (2)]—Suzuki—Micellar Synthesis

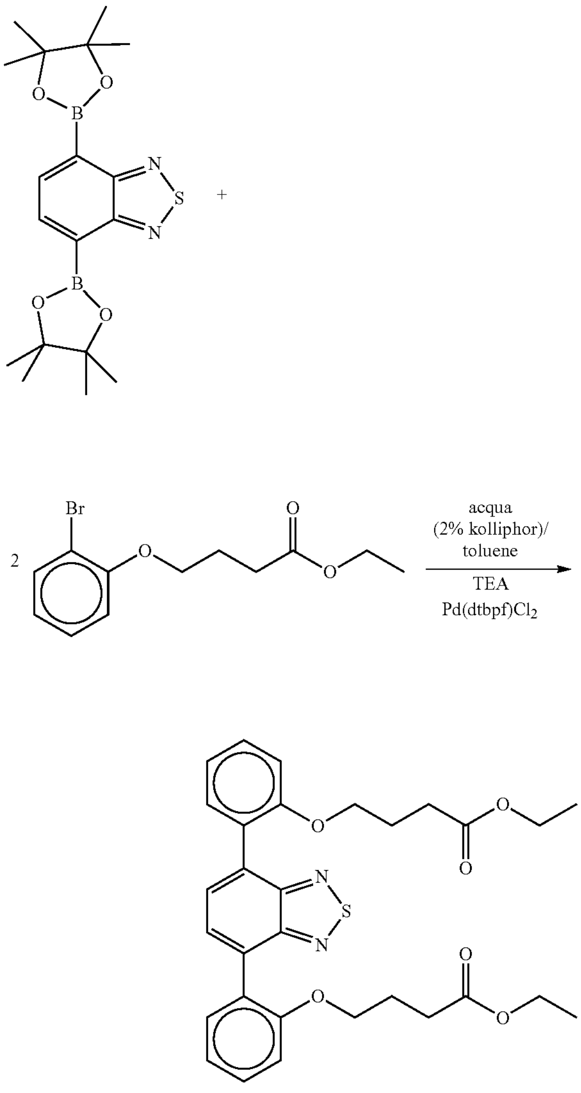

(2)

"acqua"=water

In a 100 ml round-bottom flask, equipped with mechanical stirrer, thermometer and coolant, in the presence of air, at room temperature (25° C.), under stirring, to a suspension of 2-(propyloxycarbonylethyloxy)-1-bromobenzene (Aldrich) (1000 mg, 3.5 mmol), pinacol 4,7-benzothiadiazolediboronate (Aldrich) (630 mg, 1.62 mmol) and [1,1'-bis (di-tert-butylphosphino)ferrocene]-dichloropalladium(II) [$Pd(dtbpf)Cl_2$] (Aldrich) (24 mg, 0.037 mmol), in 4.5 ml of a 9:1 (v/v) mixture of Kolliphor® EL (2% solution by weight in deionised water) (Aldrich) and toluene (Aldrich), triethylamine (TEA) (Aldrich) (1022 mg, 1.4 ml, 10 mmol) was added: the resulting reaction mixture was heated to 70° C. and kept, under stirring, at said temperature, for 15 minutes. Then, distilled water (50 ml) was added and everything was extracted with ethyl acetate (Aldrich) (3×50 ml): the organic phases obtained were combined, washed with distilled water until neutral and anhydrified on sodium sulphate (Aldrich). After removal of the solvent by distillation under reduced pressure, the residue obtained was purified by elution on a silica gel chromatography column (eluent: heptane (Aldrich)/ethyl acetate (Aldrich) in a ratio 80/20 v/v), yielding 797.8 mg of 4,7-di[2-(propyloxycarbonylethyloxy)phenyl]-benzothiadiazole [Compound (2) (yield=90%)].

EXAMPLE 8

Synthesis of 4,7-di[2,4-di(propyloxycarbonylethyloxy)phenyl]-benzothiadiazole [Compound (7)]—Suzuki—Micellar Synthesis

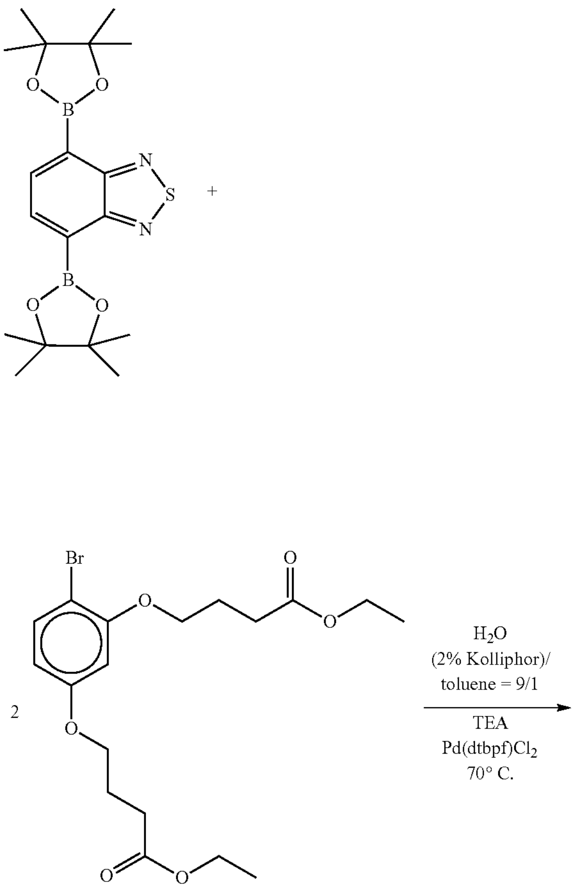

-continued

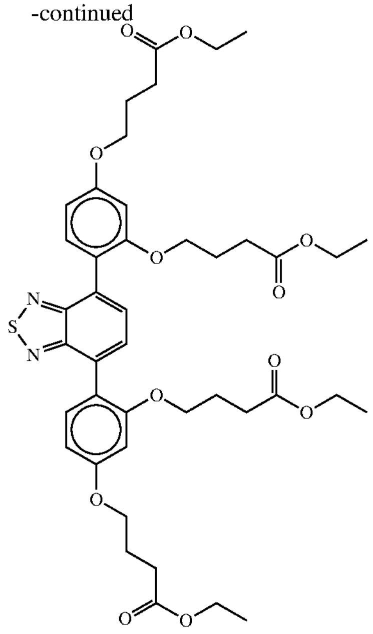

(7)

In a 100 ml round-bottom flask, equipped with mechanical stirrer, thermometer and coolant, in the presence of air, at room temperature (25° C.), under stirring, to a suspension of 2,4-(propyloxycarbonylethyloxy)-1-bromobenzene (Aldrich) (2400 mg, 5.8 mmol), pinacol 4,7-benzothiadiazolediboronate (Aldrich) (1028 mg, 2.6 mmol) and [1,1'-bis(di-tert-butylphosphino)ferrocene]-dichloropalladium(II) [$Pd(dtbpf)Cl_2$] (Aldrich) (42 mg, 0.064 mmol), in 4 ml of a 9:1 (v/v) mixture of Kolliphor® EL (2% solution by weight in deionised water) (Aldrich) and toluene (Aldrich), triethylamine (Aldrich) (1752 mg, 2.4 ml, 17.3 mmol) was added: the resulting reaction mixture was heated to 70° C. and kept, under stirring, at said temperature, for 15 minutes.

Then, distilled water (100 ml) was added and everything was extracted with ethyl acetate (Aldrich) (3×100 ml). the organic phases obtained were combined, washed with distilled water until neutral and anhydrified on sodium sulphate (Aldrich). After removal of the solvent by distillation under reduced pressure, the residue obtained was purified by elution on a silica gel chromatography column (eluent: heptane (Aldrich)/ethyl acetate (Aldrich) in a gradient from 80/20 to 70/30 to 65/35), yielding 2140 mg of 4,7-di[2,4-di(propyloxycarbonylethyloxy)phenyl]-benzothiadiazole [Compound (7) (yield=100%)].

EXAMPLE 9

Cyclic Voltammetry Measurements

Cyclic voltammetry measurements were carried out in a hemi-cell with a three-electrode configuration, with glassy carbon working electrode, platinum counter electrode and silver/silver chloride (Ag/AgCl) reference electrode. The oxidation-reduction potentials $E^{o'}_{Ox/Red}$ were derived from the position of the forward peak ($E_{pf}$) and the return peak ($E_{pr}$):

$$E^{o'}_{Ox/Red} = \frac{1}{2}(E_{pf} + E_{pr})$$

and the values were normalised with respect to the intersolvent ferrocene/ferrocenium ($Fc/Fc^+$) couple.

Evaluations were carried out on an Autolab PGSTAT 128N analytical instrument at scan rates of 10, 20, 50, 70, 100, and 200 mV/s. All evaluations were carried out in triplicate at room temperature (25° C.). For the purpose, use was made of solutions containing:

benzothiadiazole (1) (Aldrich) ($5\times10^{-3}$ M) and tetrabutylammonium tetrafluoro-borate ($TBABF_4$) (Aldrich) (0.1 M) in acetonitrile (Aldrich) (non-aqueous liquid negative electrolyte of the negative compartment) (BTD);

benzothiadiazole (1) (Aldrich) ($5\times10^{-3}$ M) and tetrabutylammonium tetrafluoro-borate ($TBABF_4$) (Aldrich) (0.1 M) in propylene carbonate (Aldrich) (non-aqueous liquid negative electrolyte of the negative compartment) (BTD);

4,7-di[2-(propyloxycarbonylethyloxy)phenyl]-benzothiadiazole [compound (2) obtained in Example 7] ($5\times10^{-3}$ M) and tetrabutylammonium tetrafluoroborate ($TBABF_4$) (Aldrich) (0.1 M) in acetonitrile (Aldrich) (non-aqueous liquid negative electrolyte of the negative compartment) (BTD);

4,7-di[2-(propyloxycarbonylethyloxy)phenyl]-benzothiadiazole [compound (2) obtained in Example 7] ($5\times10^{-3}$ M) and tetrabutylammonium tetrafluoroborate ($TBABF_4$) (Aldrich) (0.1 M) in propylene carbonate (Aldrich) (non-aqueous liquid negative electrolyte of the negative compartment) [BTD (2)];

4,7-di[2-methoxycarbonylethyloxy)phenyl]-benzothiadiazole [compound (3) obtained in Example 1] ($5\times10^{-3}$ M) and tetrabutylammonium tetrafluoroborate ($TBABF_4$) (Aldrich) (0.1 M) in acetonitrile (Aldrich) (non-aqueous liquid negative electrolyte of the negative compartment) [BTD (3)];

4,7-di[2-(methoxycarbonylethyloxy)phenyl]-benzothiadiazole [compound (3) obtained in Example 1] ($5\times10^{-3}$ M) and tetrabutylammonium tetrafluoroborate ($TBABF_4$) (Aldrich) (0.1 M) in propylene carbonate (Aldrich) (non-aqueous liquid negative electrolyte of the negative compartment) [BTD (3)];

4,7-di[2-(2-(2-methoxyethoxy)ethoxy)phenyl]-benzothiadiazole [compound (4) obtained in Example 3] ($5\times10^{-3}$ M) and tetrabutylammonium tetrafluoroborate ($TBABF_4$) (Aldrich) (0.1 M) in acetonitrile (Aldrich) (non-aqueous liquid negative electrolyte of the negative compartment) [BTD (4)];

4,7-di[2-(2-(2-methoxyethoxy)ethoxy)phenyl]-benzothiadiazole [compound (4) obtained in Example 3] ($5\times10^{-3}$ M) and tetrabutylammonium tetrafluoroborate ($TBABF_4$) (Aldrich) (0.1 M) in propylene carbonate (Aldrich) (non-aqueous liquid negative electrolyte of the negative compartment) [BTD (4)];

4,7-di[2,6-di(propyloxycarbonylethyloxy)phenyl]-benzothiadiazole [compound (5) obtained in Example 4] ($5\times10^{-3}$ M) and tetrabutylammonium tetrafluoroborate ($TBABF_4$) (Aldrich) (0.1 M) in acetonitrile (Aldrich) (non-aqueous liquid negative electrolyte of the negative compartment) [BTD (5)];

4,7-di[2,6-di(propyloxycarbonylethyloxy)phenyl]-benzothiadiazole [compound (5) obtained in Example 4] ($5\times10^{-3}$ M) and tetrabutylammonium tetrafluoroborate ($TBABF_4$) (Aldrich) (0.1 M) in propylene carbonate (Aldrich) (non-aqueous liquid negative electrolyte of the negative compartment) [BTD (5)];

4,7-di[2,5-di(propyloxycarbonylethyloxy)phenyl]-benzothiadiazole [compound (6) obtained in Example 5]

($5\times10^{-3}$ M) and tetrabutylammonium tetrafluoroborate ($TBABF_4$) (Aldrich) (0.1 M) in acetonitrile (Aldrich) (non-aqueous liquid negative electrolyte of the negative compartment) [BTD (6)];

4,7-di[2,5-di(propyloxycarbonylethyloxy)phenyl]-benzothiadiazole [compound (6) obtained in Example 5] ($5\times10^{-3}$ M) and tetrabutylammonium tetrafluoroborate ($TBABF_4$) (Aldrich) (0.1 M) in propylene carbonate (Aldrich) (non-aqueous liquid negative electrolyte of the negative compartment) [BTD (6)];

4,7-di[2,4-di(propyloxycarbonylethyloxy)phenyl]-benzothiadiazole [compound (7) obtained in Example 8] ($5\times10^{-3}$ M) and tetrabutylammonium tetrafluoroborate ($TBABF_4$) (Aldrich) (0.1 M) in acetonitrile (Aldrich) (non-aqueous liquid negative electrolyte of the negative compartment) [BTD (7)];

4,7-di[2,4-di(propyloxycarbonylethyloxy)phenyl]-benzothiadiazole [compound (7) obtained in Example 8] ($5\times10^{-3}$ M) and tetrabutylammonium tetrafluoroborate ($TBABF_4$) (Aldrich) (0.1 M) in propylene carbonate (Aldrich) (non-aqueous liquid negative electrolyte of the negative compartment) [BTD (7)];

copper(II) trifluoromethanesulphonate [$Cu(CF_3SO_3)_2$] (Aldrich) ($5\times10^{-4}$ M) and tetrabutylammonium tetrafluoroborate ($TBABF_4$) (Aldrich) (0.1 M) in acetonitrile (Aldrich) (non-aqueous liquid positive electrolyte of the positive compartment) (Cu triflate);

tetrakisacetonitrile copper(I) tetrafluoroborate [$Cu(NCCH_3)_4\cdot BF_4$] (Aldrich) ($5\times10^{-4}$ M) and tetrabutylammonium tetrafluoroborate ($TBABF_4$) (Aldrich) (0.1 M) in acetonitrile (Aldrich) (non-aqueous liquid positive electrolyte of the positive compartment) [Cu(I) tetrafluoroborate];

tetrakisacetonitrile copper(I) triflate [$Cu(NCCH_3)_4\cdot CF_3SO_3$] (Aldrich) ($5\times10^{-4}$ M) and tetrabutylammonium tetrafluoroborate ($TBABF_4$) (Aldrich) (0.1 M) in propylene carbonate (Aldrich) (non-aqueous liquid positive electrolyte of the positive compartment) [Cu(I)].

The values obtained are reported in Table 2.

TABLE 2

| Compound | BTD | 2 | 3 | 4 | 5 | 6 | 7 | Cu triflate |
|---|---|---|---|---|---|---|---|---|
| E°' ACN (V vs Fc/Fc+) | −1.90 | −1.91 | −1.86 | −1.90 | −2.00 | −1.88 | −1.93 | 0.62 |
| E°' PC (V vs Fc/Fc+) | −1.86 | −1.84 | −1.82 | −1.85 | −1.95 | −1.83 | −1.88 | 0.43 |

FIGS. 2-8 [the abscissa shows the potential (E) measured in volts (V) and the ordinate shows the current density (J) measured in amperes/cm$^2$ (A cm$^{-2}$)] show the cyclic voltagram obtained from the above solutions [BTD and compounds (2)-(7)] in acetonitrile and propylene carbonate, at a scan rate of 200 mV/s.

Considering, for example, the solution of compound (2) in acetonitrile, it can be seen that a high potential difference (E°) of 2.53 V is obtained in open circuit, calculated according to the following formula:

$$E°=(E°_1)-(E°_2)$$

wherein:

(E°$_1$) is the oxidation-reduction potential for (Cu triflate) calculated as described above and is equal to 0.62 V vs (Fc/Fc$^+$);

(E°$_2$) is the oxidation-reduction potential for the different solutions calculated as described above and reported in Table 2 (Example 2 is equal to −1.91).

EXAMPLE 10

Stability Tests in Cyclic Voltammetry

Stability tests were carried out using the same electrochemical cell as in Example 9.

For the purpose, use was made of solutions containing:

4,7-di[2-(propyloxycarbonylethyloxy)phenyl]-benzothiadiazole [Compound (2) obtained in Example 2 or 7] ($1\times10^{-3}$ M) and tetrabutylammonium tetrafluoroborate ($TBABF_4$) (Aldrich) 0.1 M in acetonitrile (Aldrich) (non-aqueous liquid negative electrolyte of the negative compartment).

Figure 9:
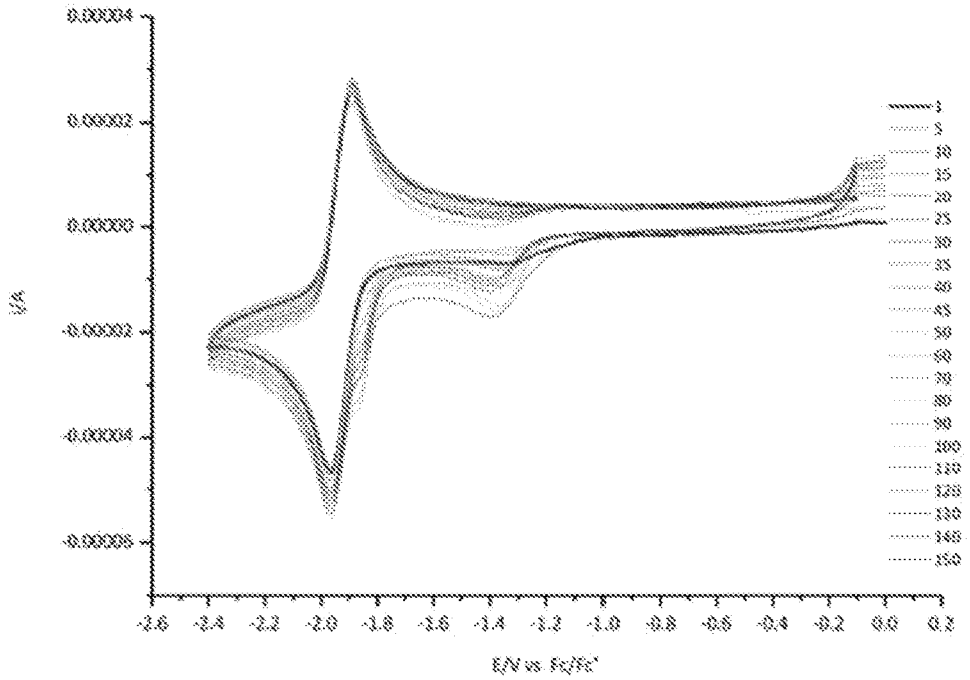

FIG. 9 [the abscissa shows the potential (E) measured in volts (V) and the ordinate shows the current intensity (i) measured in amperes (A)] shows the 150 successive redox cycles carried out for the above 4,7-di[2-(propyloxycarbonylethyloxy)phenyl]-benzothiadiazole solution [Compound (2) obtained in Example 7]: it can be seen that the cycles are superimposable, which means that there is no deposition of material on the electrode due to parasitic reactions or polymerisation reactions and that the radical formed is stable.

EXAMPLE 11

Non-Aqueous Redox Flow Battery (RFB) Charge/Discharge Tests [Electrolytes: 4,7-di[2-(propyloxycarbonylethyloxy)phenyl]-benzothiadiazole [Compound (2)] and copper(I) tetrakisacetonitrile tetrafluoroborate [$Cu(NCCH_3)_4\cdot BF_4$] in acetonitrile]

Charge-discharge tests were carried out using an electrochemical cell with a Teflon® membrane (DuPont), having a surface area equal to approximately 0.8 cm$^2$, placed between two platinum electrodes (Methrohm) having a surface area equal to approximately 0.07 cm$^2$. The electrochemical cell was then assembled and sealed in a container containing argon (Ar).

For the purpose, use was made of solutions containing:

4,7-di[2-(propyloxycarbonylethyloxy)phenyl]-benzothiadiazole [Compound (2) obtained in Example 7]: ($1\times10^{-3}$ M) and tetrabutylammonium tetrafluoroborate ($TBABF_4$) (Aldrich) (0.1 M) in acetonitrile (Aldrich) (non-aqueous liquid negative electrolyte of the negative compartment), degassed with argon (Ar) and subjected to electrolysis in order to obtain benzothiadiazole in reduced form [(BTD (2)$\cdot^-$)];

tetrakisacetonitrile copper(I) tetrafluoroborate [$Cu(NCCH_3)_4\cdot BF_4$] ($1\times10^{-3}$ M) and tetrabutylammonium tetrafluoroborate ($TBABF_4$) (Aldrich) (0.1 M) in acetonitrile (Aldrich) (non-aqueous liquid positive electrolyte of the positive compartment) (Cu triflate), degassed with argon (Ar).

6 ml of the above solutions were introduced into the respective compartments.

The test was carried out using a potentiostat/galvanostat Autolab PGSTAT 128N (Metrohom) at room temperature (25° C.).

Charge and discharge curves were carried out to assess the performance of the electrolytes in the cell. The tests were carried out in potentiostatic mode, applying a charging potential of 2.5 V and a discharging potential of 0.5 V. Each potential was applied for 240 seconds.

Figure 10:
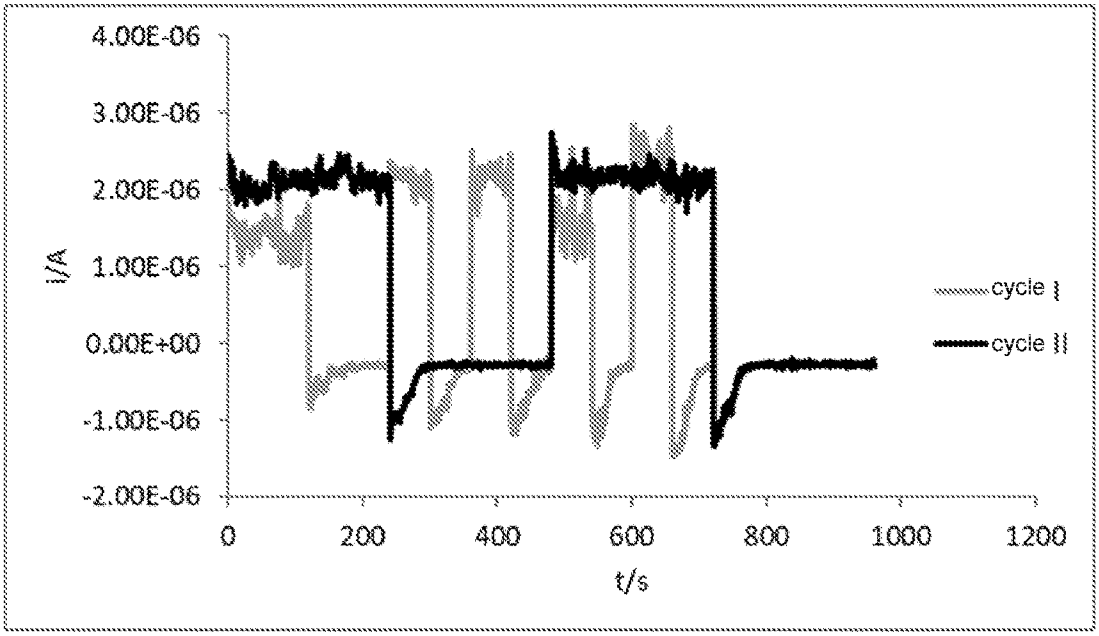

FIG. 10 [the abscissa shows the time measured in seconds (t/s); the ordinate shows the current intensity (i) measured in amperes (A)] shows the charge/discharge curve obtained. During discharge, the current has a negative sign due to the passage of electrons from the negative pole [(BTD (2)·⁻)] to the positive pole (Cu). Conversely, during charging, the current has a positive sign. The current intensity values are stable, so both species are characterised by good stability during oxidation-reduction cycles (or redox cycles).

The invention claimed is:

1. A non-aqueous redox flow battery (RFB) comprising:

a positive compartment in which a positive electrode is placed and in which a non-aqueous liquid positive electrolyte is made to flow;

a negative compartment in which a negative electrode is placed and in which a non-aqueous liquid negative electrolyte is made to flow;

an ion exchange membrane placed between the positive compartment and the negative compartment;

wherein:

said non-aqueous liquid positive electrolyte comprises a solution of copper triflate or tetrafluoroborate complexes [Cu(I) or Cu(II)] in at least one organic solvent;

said non-aqueous liquid negative electrolyte comprises a solution of at least one benzothiadiazole having general formula (I):

(I)

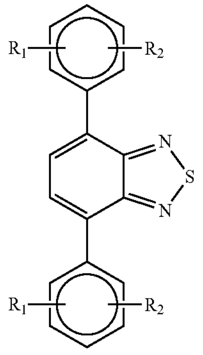

wherein:

$R_1$ and $R_2$, equal or different from each other, represent a hydrogen atom; or represent a $C_1$-$C_{20}$ alkyl group, linear or branched, saturated or unsaturated; or represent a —O—$R_3$ group wherein $R_3$ is selected from $C_1$-$C_{20}$ alkyl groups, linear or branched, saturated or unsaturated, or $R_3$ is selected from —$(CH_2)_nCOOR_4$ groups wherein $R_4$ is selected from $C_1$-$C_{20}$ alkyl groups, linear or branched, saturated or unsaturated, and n is an integer comprised between 1 and 10, or $R_3$ is selected from —$(CH_2)_nOR_4$ groups wherein $R_4$ and n have the same meanings reported above, or $R_3$ is selected from —$(CH_2CH_2O)_nR_4$ groups wherein $R_4$ and n have the same meanings reported above, or $R_3$ is selected from —$(CH_2)_nCN$ groups wherein n has the same meanings reported above, or $R_3$ is selected from —$(CH_2)_nNR_4R_5$ groups wherein $R_4$ and n have the same meanings reported above and $R_5$ is selected from $C_1$-$C_{20}$ alkyl groups, linear or branched, saturated or unsaturated, or $R_3$ is selected from —$(CH_2)_nCONR_4R_5$ groups wherein $R_4$, $R_5$ and n have the same meanings reported above, saturated or unsaturated, or $R_3$ is selected from —$(CH_2)_nSi(R_4)_3$ groups wherein $R_4$ and n have the same meanings reported above, or $R_3$ is selected from —$(CH_2)_nSi(OR_4)_3$ groups wherein $R_4$ and n have the same meanings reported above;

provided that at least one of $R_1$ and $R_2$ is different from hydrogen and at least one of $R_1$ and $R_2$ is in position 2 of the phenyl;

in at least one organic solvent.

2. The non-aqueous redox flow battery (RFB) according to claim 1, wherein said copper triflate or tetrafluoroborate complexes [Cu(I) o Cu(II)] are selected from the group consisting of: tetrakisacetonitrile copper (I) triflate [$Cu(NCCH_3)_4 \cdot CF_3SO_3$], copper (II) trifluoromethanesulfonate [$Cu(CF_3SO_3)_2$], tetrakisacetonitrile copper (I) tetrafluoroborate [$Cu(NCCH_3)_4 \cdot BF_4$], and mixtures thereof.

3. The non-aqueous redox flow battery (RFB) according to claim 1, wherein in said general formula (I):

$R_1$ and $R_2$, equal or different from each other, represent a hydrogen atom; or represent a group —$OR_3$ wherein $R_3$ is selected from —$(CH_2)_nCOOR_4$ groups wherein $R_4$ is selected from alkyl groups $C_1$-$C_{20}$, linear or branched, saturated or unsaturated, and n is an integer comprised between 1 and 10, or $R_3$ is selected from —$(CH_2CH_2O)_nR_4$ groups wherein $R_4$ and n have the same meanings reported above;

provided that at least one of $R_1$ and $R_2$ is different from hydrogen and at least one of $R_1$ and $R_2$ is in position 2 of the phenyl.

4. The non-aqueous redox flow battery (RFB) according to claim 1, wherein the aforesaid electrolytes comprise at least one supporting electrolyte selected from the group consisting of: lithium tetrafluoroborate ($LiBF_4$), lithium hexafluorophosphate ($LiPF_6$), lithium perchlorate ($LiClO_4$), lithium methyltrifluoromethanesulfonate ($LiCF_3SO_3$), lithium bis(trifluoromethylsulfonyl)imide [$Li(CF_3SO_2)_2N$], tetraethylammonium tetrafluoroborate ($TEABF_4$), tetrabutylammonium tetrafluoroborate ($TBABF_4$), and mixtures thereof.

5. The non-aqueous redox flow battery (RFB) according to claim 1, wherein said organic solvent is selected from the group consisting of acetonitrile, dimethyl acetamide, diethyl carbonate, dimethyl carbonate, γ-butyrolactone (GBL), propylene carbonate (PC), ethylene carbonate (EC), N-methyl-2-pyrrolidone (NMP), fluoroethylene carbonate, N,N-dimethylacetamide, and mixtures thereof.

6. The non-aqueous redox flow battery (RFB) according to claim 1, wherein said ion exchange membrane is selected from polymeric membranes such as:

ion exchange membranes such as membranes based on a styrene-divinylbenzene copolymer or a chloromethylstyrene-divinylbenzene copolymer containing amino groups, membranes based on poly (ether ether ketones), membranes based on a divinylbenzene-vinylpyridine copolymer containing a quaternary pyridine group; membranes based on an aromatic polysulfonic copolymer containing a chloromethyl group and amino groups, membranes based on polytetrafluoroethylene (PTFE);

cation exchange membranes such as membranes based on a fluoropolymer-copolymer based on polytetrafluoroethylene sulfonate, membranes based on poly (ether ether ketones), membranes based on polysulfones, membranes based on polyethylene, membranes based on polypropylene, membranes based on ethylene-propylene copolymers, membranes based on polyimides, membranes based on polyvinyl fluorides.

* * * * *